(12) United States Patent
Xu et al.

(10) Patent No.: US 11,515,972 B2
(45) Date of Patent: Nov. 29, 2022

(54) METHOD AND APPARATUS FOR DETERMINING TIME-DOMAIN RESOURCE USED FOR GRANT-FREE TRANSMISSION

(71) Applicant: Huawei Technologies Co., Ltd., Shenzhen (CN)

(72) Inventors: Xiuqiang Xu, Shanghai (CN); Yan Chen, Shanghai (CN); Liqing Zhang, Ottawa (CA); Yi Wang, Shanghai (CN); Yinggang Du, Shenzhen (CN); Yu Cao, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 16/875,824

(22) Filed: May 15, 2020

(65) Prior Publication Data

US 2020/0280403 A1   Sep. 3, 2020

Related U.S. Application Data

(63) Continuation of application No. PCT/CN2018/116124, filed on Nov. 19, 2018.

(Continued)

(51) Int. Cl.
*H04W 72/04* (2009.01)
*H04W 72/12* (2009.01)
*H04L 5/00* (2006.01)

(52) U.S. Cl.
CPC ....... *H04L 5/0007* (2013.01); *H04W 72/0446* (2013.01); *H04W 72/12* (2013.01)

(58) Field of Classification Search
CPC ............ H04W 72/00446; H04W 72/12; H04L 5/0007

(Continued)

(56) References Cited

U.S. PATENT DOCUMENTS

2010/0195566 A1   8/2010   Krishnamurthy et al.
2011/0149868 A1   6/2011   Krishnamurthy et al.
(Continued)

FOREIGN PATENT DOCUMENTS

CN   102932925 A   2/2013
CN   106507486 A   3/2017
(Continued)

OTHER PUBLICATIONS

Vivo, "Discussion on UL grant-free resource configuration," 3GPP TSG-RAN WG2 Meeting#99, Berlin, Germany, R2-1708486 (Revised of R2-1707063), total 4 pages, 3rd Generation Partnership Project, Valbonne, France (Aug. 21-25, 2017).

(Continued)

*Primary Examiner* — Angel T Brockman
(74) *Attorney, Agent, or Firm* — Leydig, Voit & Mayer, Ltd.

(57) ABSTRACT

This application provides a method for determining a time-domain resource used for grant-free transmission. The method includes: obtaining, by a terminal device, a first time-domain period and a second time-domain period of grant-free transmission resources, where a size of the first time-domain period is $P_1$ time units, a size of the second time-domain period is $P_2$ time units, and $P_1$ is greater than or equal to $P_2$; obtaining, by the terminal device, a quantity k of grant-free transmission resources in the first time-domain period; and determining, by the terminal device based on the first time-domain period, the second time-domain period, and the quantity k of grant-free transmission resources in the first time-domain period, an index of a time unit in which a grant-free transmission resource used for grant-free transmission is located. In this way, grant-free transmission resources configured for the terminal device in two adjacent periods do not overlap.

14 Claims, 14 Drawing Sheets

Related U.S. Application Data

(60) Provisional application No. 62/588,133, filed on Nov. 17, 2017.

(58) Field of Classification Search
USPC ............................................................ 370/330
See application file for complete search history.

(56) References Cited

U.S. PATENT DOCUMENTS

| | | | |
|---|---|---|---|
| 2014/0153554 A1 | 6/2014 | He et al. | |
| 2017/0318598 A1 | 11/2017 | Islam et al. | |
| 2018/0199381 A1 | 7/2018 | Rong et al. | |
| 2019/0045489 A1* | 2/2019 | He | H04L 1/1887 |

FOREIGN PATENT DOCUMENTS

| | | |
|---|---|---|
| CN | 106507497 A | 3/2017 |
| RU | 2522175 C2 | 7/2014 |
| WO | 2015109571 A1 | 7/2015 |
| WO | 2016119651 A1 | 8/2016 |
| WO | 2016205991 A1 | 12/2016 |
| WO | 2017011942 A1 | 1/2017 |
| WO | 2017041683 A1 | 3/2017 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.4.0, pp. 1-108, 3rd Generation Partnership Project, Valbonne, France (Sep. 2017).

"Considerations on grant free transmission for NR," 3GPP TSG-RAN WG2 Meeting #96, Reno, Nevada, USA, R2-168478, Total 2 pages, 3rd Generation Partnership Project, Valbonne, France (Nov. 14-18, 2016).

"3rd Generation Partnership Project; Technical Specification Group Radio Access Network; NR; Medium Access Control (MAC) protocol specification (Release 15)," 3GPP TS 38.321 V1.1.0, pp. 1-64, 3rd Generation Partnership Project, Valbonne, France (Nov. 2017).

"3rd Generation Partnership Project; Technical Specification Group Radio Access Network; NR; Radio Resource Control (RRC); Protocol specification (Release 15)," 3GPP TS 38.331 V0.1.0, pp. 1-42, 3rd Generation Partnership Project, Valbonne, France (Oct. 2017).

"UL data transmission procedure without UL grant," 3GPP TSG RAN WG1 Meeting #91, Reno, USA, R1-1719411, Total 14 pages, 3rd Generation Partnership Project, Valbonne, France (Nov. 27-Dec. 1, 2017).

"Discussion on UL grant-free resource configuration," 3GPP TSG-RAN WG2 Meeting#99, R2-1708486 (Revised of R2-1707063), Berlin, Germany, pp. 1-4 pages, 3rd Generation Partnership Project, Valbonne, France (Aug. 21-25, 2017).

"UL data transmission procedures in NR," 3GPP TSG RAN WG1 Meeting 90bis, R1-1717396, Prague, Czech Republic, pp. 1-12, 3rd Generation Partnership Project, Valbonne, France (Oct. 9-13, 2017).

"Discussion on UL data transmission procedure," 3GPP TSG RAN WG1 Meeting 90bis, R1-1717968, Prague, CZ, Total 12 pages, 3rd Generation Partnership Project, Valbonne, France (Oct. 9-13, 2017).

* cited by examiner

METHOD AND APPARATUS FOR DETERMINING TIME-DOMAIN RESOURCE USED FOR GRANT-FREE TRANSMISSION

CROSS-REFERENCE TO RELATED APPLICATIONS

This application is a continuation of International Application No. PCT/CN2018/116124, filed on Nov. 19, 2018, which claims priority to U.S. Patent Application No. 62/588,133, filed on Nov. 17, 2017, The disclosures of the aforementioned applications are hereby incorporated by reference in their entireties.

TECHNICAL FIELD

This application relates to the communications field, and more specifically, to a method and an apparatus for determining a time-domain resource used for grant-free transmission.

BACKGROUND

Uplink grant-free transmission is an uplink data sending method in which data is sent immediately after received. To be specific, when data arrives, instead of sending a scheduling request (SR) to a network device to request the network device to allocate an uplink transmission resource, and sending the uplink data to the network device after receiving grant information sent by the network device, a terminal device directly sends the uplink data to the network device by using a resource pre-allocated by the network device, a specified transmission parameter, and the like. In comparison with a conventional "request-grant"-based transmission method, an uplink data sending method in which data is sent immediately after received, such as uplink grant-free transmission, has obvious beneficial effects. For example, uplink grant-free transmission can greatly reduce signaling overheads, a transmission latency, and power consumption of a terminal device.

In uplink grant-free transmission, a network device needs to pre-allocate a grant-free transmission resource to a terminal device, which specifically includes: allocating, to the terminal device, a transmission resource, transmission parameters, and the like. The transmission parameters mainly include: a grant-free transmission resource time-domain period, a time-domain resource offset parameter, a time-domain resource allocation, a frequency-domain resource allocation, user-specific demodulation reference signal configuration information, a modulation and coding scheme/a transport block size, a quantity of repetitions, a power control-related parameter, and the like.

In the prior art, there is a method for configuring grant-free transmission resources based on dual periods. To be specific, grant-free transmission resources that are allocated by a network device to a terminal device have two time-domain periods, where a long time-domain period is used to configure the first grant-free transmission resource in a grant-free transmission resource group, and a short time-domain period is used to configure another grant-free transmission resource in the grant-free transmission resource group. In the existing grant-free transmission resource configuration method, a previous grant-free transmission resource group may overlap a current grant-free transmission resource group, resulting in high complexity of determining a time unit in which a grant-free transmission resource of the terminal device is located.

SUMMARY

This application provides a method for determining a time-domain resource used for grant-free transmission, so that grant-free transmission resources configured for a terminal device in two adjacent periods do not overlap.

According to a first aspect, a method for determining a time-domain resource used for grant-free transmission is provided, including: obtaining, by a terminal device, a first time-domain period and a second time-domain period of grant-free transmission resources, where a size of the first time-domain period is $P_1$ time units, a size of the second time-domain period is $P_2$ time units, and $P_1$ is greater than or equal to $P_2$; obtaining, by the terminal device, a quantity k of grant-free transmission resources in the first time-domain period; and determining, by the terminal device based on the first time-domain period, the second time-domain period, and the quantity k of grant-free transmission resources in the first time-domain period, an index of a time unit in which a grant-free transmission resource used for grant-free transmission is located.

Optionally, the terminal device determines, based on only the second time-domain period, the quantity k of grant-free transmission resources that are allocated by a network device to the terminal device.

Specifically, after a first-type grant-free transmission resource in the current first time-domain period, the terminal device determines a quantity of second-type grant-free transmission resources based on the second time-domain period $P_2$; and when a determined second-type grant-free transmission resource is located in a first time-domain period following the current first time-domain period, ignores or discards the determined second-type grant-free transmission resource located in the first time-domain period following the current first time-domain period.

The quantity k of grant-free transmission resources is determined, and the index of the time unit in which the grant-free transmission resource used for grant-free transmission is located is determined based on the first time-domain period, the second time-domain period, and the quantity k of grant-free transmission resources in the first time-domain period. In this way, grant-free transmission resources configured for the terminal device in two adjacent periods do not overlap.

With reference to the first aspect, in a possible implementation of the first aspect, the determining, by the terminal device based on the first time-domain period, the second time-domain period, and the quantity k of grant-free transmission resources in the first time-domain period, an index of a time unit in which a grant-free transmission resource is located includes: determining, by the terminal device based on an index of a time unit in which the first grant-free transmission resource is located, the first time-domain period, the second time-domain period, and the quantity k of grant-free transmission resources in the first time-domain period, the index of the time unit in which the grant-free transmission resource is located.

The quantity k of grant-free transmission resources is determined, and the index of the time unit in which the grant-free transmission resource used for grant-free transmission is located is determined based on the index of the time unit in which the first grant-free transmission resource is located, the first time-domain period, the second time-domain period, and the quantity k of grant-free transmission resources in the first time-domain period. In this way, grant-free transmission resources configured for the terminal device in two adjacent periods do not overlap.

With reference to the first aspect, in a possible implementation of the first aspect, when the time unit is specifically a mini-slot, the method further includes: obtaining, by the terminal device, format information of the mini-slot, where the format information of the mini-slot includes at least a quantity of orthogonal frequency division multiplexing OFDM symbols included in each mini-slot and a location of a starting OFDM symbol of each mini-slot in each slot, or includes a location of a starting OFDM symbol and a location of an end OFDM symbol that are of each mini-slot in each slot. The quantity k of grant-free transmission resources in the first time-domain period is determined based on the first time-domain period, the second time-domain period, and the format information of the mini-slot.

According to a second aspect, a method for determining a time-domain resource used for grant-free transmission is provided, including: obtaining, by a network device, a quantity k of grant-free transmission resources in a first time-domain period of a grant-free transmission resource; and determining, by the network device based on the first time-domain period, a second time-domain period of a grant-free transmission resource, and the quantity k of grant-free transmission resources in the first time-domain period, an index of a time unit in which a grant-free transmission resource used for receiving grant-free data is located, where a size of the first time-domain period is $P_1$ time units, a size of the second time-domain period is $P_2$ time units, and $P_1$ is greater than or equal to $P_2$.

The quantity k of grant-free transmission resources is determined, and the index of the time unit in which the grant-free transmission resource used for grant-free transmission is located is determined based on the first time-domain period, the second time-domain period, and the quantity k of grant-free transmission resources in the first time-domain period. In this way, grant-free transmission resources configured for a terminal device in two adjacent periods do not overlap.

With reference to the second aspect, in a possible implementation of the second aspect, the determining, by the network device based on the first time-domain period, a second time-domain period of a grant-free transmission resource, and the quantity k of grant-free transmission resources in the first time-domain period, an index of a time unit in which a grant-free transmission resource used for receiving grant-free data is located includes: determining, by the network device based on an index of a time unit in which the first grant-free transmission resource is located, the first time-domain period, the second time-domain period, and the quantity k of grant-free transmission resources in the first time-domain period, the index of the time unit in which the grant-free transmission resource used for receiving the grant-free data is located.

The quantity k of grant-free transmission resources is determined, and the index of the time unit in which the grant-free transmission resource used for grant-free transmission is located is determined based on the index of the time unit in which the first grant-free transmission resource is located, the first time-domain period, the second time-domain period, and the quantity k of grant-free transmission resources in the first time-domain period. In this way, grant-free transmission resources configured for a terminal device in two adjacent periods do not overlap.

With reference to the second aspect, in a possible implementation of the second aspect, when the time unit is specifically a mini-slot, the method further includes: determining, by the network device, format information of the mini-slot, where the format information of the mini-slot includes at least a quantity of orthogonal frequency division multiplexing OFDM symbols included in each mini-slot and a location of a starting OFDM symbol of each mini-slot in each slot, or includes a location of a starting OFDM symbol and a location of an end OFDM symbol that are of each mini-slot in each slot. The quantity k of grant-free transmission resources in the first time-domain period is determined based on the first time-domain period, the second time-domain period, and the format information of the mini-slot.

According to a third aspect, a terminal device is provided, including a processing module. The processing module is configured to obtain a first time-domain period and a second time-domain period of grant-free transmission resources, where a size of the first time-domain period is $P_1$ time units, a size of the second time-domain period is $P_2$ time units, and $P_1$ is greater than or equal to $P_2$. The processing module is further configured to obtain a quantity k of grant-free transmission resources in the first time-domain period. The processing module is further configured to determine, based on the first time-domain period, the second time-domain period, and the quantity k of grant-free transmission resources in the first time-domain period, an index of a time unit in which a grant-free transmission resource used for grant-free transmission is located.

With reference to the third aspect, in a possible implementation of the third aspect, the processing module is further configured to determine, based on an index of a time unit in which the first grant-free transmission resource is located, the first time-domain period, the second time-domain period, and the quantity k of grant-free transmission resources in the first time-domain period, the index of the time unit in which the grant-free transmission resource used for grant-free transmission is located.

With reference to the third aspect, in a possible implementation of the third aspect, when the time unit is specifically a mini-slot, the processing module is further configured to obtain format information of the mini-slot, where the format information of the mini-slot includes at least a quantity of orthogonal frequency division multiplexing OFDM symbols included in each mini-slot and a location of a starting OFDM symbol of each mini-slot in each slot, or includes a location of a starting OFDM symbol and a location of an end OFDM symbol that are of each mini-slot in each slot. Correspondingly, the quantity k of grant-free transmission resources in the first time-domain period is determined based on the first time-domain period, the second time-domain period, and the format information of the mini-slot.

According to a fourth aspect, a network device is provided, including a processing module. The processing module is configured to obtain a quantity k of grant-free transmission resources in a first time-domain period of a grant-free transmission resource. The processing module is further configured to determine, based on the first time-domain period, a second time-domain period of a grant-free transmission resource, and the quantity k of grant-free transmission resources in the first time-domain period, an index of a time unit in which a grant-free transmission resource used for receiving grant-free data is located. A size of the first time-domain period is $P_1$ time units, a size of the second time-domain period is $P_2$ time units, and $P_1$ is greater than or equal to $P_2$.

With reference to the fourth aspect, in a possible implementation of the fourth aspect, the processing module is further configured to determine, based on an index of a time unit in which the first grant-free transmission resource is located, the first time-domain period, the second time-domain period, and the quantity k of grant-free transmission resources in the first time-domain period, the index of the time unit in which the grant-free transmission resource used for receiving the grant-free data is located.

With reference to the fourth aspect, in a possible implementation of the fourth aspect, when the time unit is specifically a mini-slot, the processing module is further configured to determine format information of the mini-slot, where the format information of the mini-slot includes at least a quantity of orthogonal frequency division multiplexing OFDM symbols included in each mini-slot and a location of a starting OFDM symbol of each mini-slot in each slot, or includes a location of a starting OFDM symbol and a location of an end OFDM symbol that are of each mini-slot in each slot. Correspondingly, the quantity k of grant-free transmission resources in the first time-domain period is determined based on the first time-domain period, the second time-domain period, and the format information of the mini-slot.

With reference to any one of the possible implementations of the first aspect to the fourth aspect, in a possible implementation of the first aspect to the fourth aspect, the determining, based on an index of a time unit in which the first grant-free transmission resource is located, the first time-domain period, the second time-domain period, and the quantity k of grant-free transmission resources in the first time-domain period, the index of the time unit in which the grant-free transmission resource is located includes: determining an index of a time unit in which a grant-free transmission resource Y is located, according to any one of the following relational expressions:

$$TU\_index = Starting\_index + floor(Y/k)*P1 + (Y \bmod k)*P2;$$

$$TU\_index = [Starting\_index + floor(Y/k)*P1 + (Y \bmod k)*P2] \bmod X;$$

$$TU\_index = Starting\_index + floor(Y/k)*P1 + (Y \bmod k)*P2 + F2;$$

or $$TU\_index = [Starting\_index + floor(Y/k)*P1 + (Y \bmod k)*P2 + F2] \bmod X,$$

where:
$F_2$ represents a correction parameter, and a value of $F_2$ is related to a value of Y;
Y is a nonnegative integer, and is used to indicate a sequence number of a grant-free transmission resource;
X is a preset nonnegative integer;
Starting_index represents the index of the time unit in which the first grant-free transmission resource is located; and
TU_index represents an index of a time unit in which any grant-free transmission resource including the first grant-free transmission resource is located.

With reference to any one of the possible implementations of the first aspect to the fourth aspect, in a possible implementation of the fourth aspect, the quantity k of grant-free transmission resources in the first time-domain period is determined based on the first time-domain period and the second time-domain period.

The quantity k of grant-free transmission resources is determined based on the first time-domain period and the second time-domain period, and the index of the time unit in which the grant-free transmission resource used for grant-free transmission is located is determined based on the index of the time unit in which the first grant-free transmission resource is located, the first time-domain period, the second time-domain period, and the quantity k of grant-free transmission resources in the first time-domain period. In this way, grant-free transmission resources configured for the terminal device in two adjacent periods do not overlap.

With reference to any one of the possible implementations of the first aspect to the fourth aspect, in a possible implementation of the first aspect to the fourth aspect, the determining a quantity k of grant-free transmission resources in the first time-domain period based on the first time-domain period and the second time-domain period includes: determining the quantity k of grant-free transmission resources in the first time-domain period according to the following relational expression:

$$k = \mathrm{ceil}(P_1/P_2).$$

With reference to any one of the possible implementations of the first aspect to the fourth aspect, in a possible implementation of the first aspect to the fourth aspect, the determining a quantity k of grant-free transmission resources in the first time-domain period based on the first time-domain period and the second time-domain period includes: determining the quantity k of grant-free transmission resources in the first time-domain period according to the following relational expression:

$$k = \mathrm{floor}[(P_1 - T)/P_2] + 1,$$

where
T represents a quantity of time units included in any grant-free transmission resource in the first time-domain period.

The quantity k of grant-free transmission resources is determined based on the first time-domain period, the second time-domain period, and a transmission time unit length, and the index of the time unit in which the grant-free transmission resource used for grant-free transmission is located is determined based on the index of the time unit in which the first grant-free transmission resource is located, the first time-domain period, the second time-domain period, and the quantity k of grant-free transmission resources in the first time-domain period. In this way, grant-free transmission resources configured for the terminal device in two adjacent periods do not overlap.

With reference to any one of the possible implementations of the first aspect to the fourth aspect, in a possible implementation of the first aspect to the fourth aspect, the determining a quantity k of grant-free transmission resources in the first time-domain period based on the first time-domain period and the second time-domain period includes: determining the quantity k of grant-free transmission resources in the first time-domain period according to the following relational expression:

$$k = \min[\mathrm{ceil}(P_1/P_2), N],$$

where
N represents a maximum quantity of times of repeated transmission, the maximum quantity of times of repeated transmission is a maximum quantity of times of sending same uplink data to the network device before feedback information sent by the network device is received, and $N \geq 1$.

The quantity k of grant-free transmission resources is determined based on the first time-domain period, the second time-domain period, and the maximum quantity of times of repeated transmission, and the index of the time unit in which the grant-free transmission resource used for grant-free transmission is located is determined based on the index of the time unit in which the first grant-free transmission resource is located, the first time-domain period, the second time-domain period, and the quantity k of grant-free transmission resources in the first time-domain period. In this way, grant-free transmission resources configured for the terminal device in two adjacent periods do not overlap.

With reference to any one of the possible implementations of the first aspect to the fourth aspect, in a possible implementation of the first aspect to the fourth aspect, the determining a quantity k of grant-free transmission resources in the first time-domain period based on the first time-domain period and the second time-domain period includes: determining the quantity k of grant-free transmission resources in the first time-domain period according to the following relational expression:

$$k=\min[\text{floor}[(P_1-T)/P_2]+1,N],$$

where

T represents a quantity of time units included in any grant-free transmission resource in the first time-domain period, N represents a maximum quantity of times of repeated transmission, the maximum quantity of times of repeated transmission is a maximum quantity of times of sending same uplink data to the network device before feedback information sent by the network device is received, and $N \geq 1$.

The quantity k of grant-free transmission resources is determined based on the first time-domain period, the second time-domain period, a transmission time unit length, and the maximum quantity of times of repeated transmission, and the index of the time unit in which the grant-free transmission resource used for grant-free transmission is located is determined based on the index of the time unit in which the first grant-free transmission resource is located, the first time-domain period, the second time-domain period, and the quantity k of grant-free transmission resources in the first time-domain period. In this way, grant-free transmission resources configured for the terminal device in two adjacent periods do not overlap.

With reference to any one of the possible implementations of the first aspect to the fourth aspect, in a possible implementation of the first aspect to the fourth aspect, the time unit includes at least any one of the following time units: a radio frame, a subframe, a slot, and an orthogonal frequency division multiplexing OFDM symbol.

According to a fifth aspect, a terminal device is provided. The terminal device includes a memory and a processor. The memory is configured to store an instruction. The processor is configured to execute the instruction stored in the memory, and the execution of the instruction stored in the memory enables the terminal device to perform the method in any one of the first aspect or the possible implementations of the first aspect.

According to a sixth aspect, a computer readable storage medium is provided. A computer program is stored in the computer readable storage medium. When the program is executed by a processor, the method in any one of the first aspect or the possible implementations of the first aspect is implemented.

According to a seventh aspect, a computer program product is provided. The computer program product includes computer program code. When the computer program code is run by a processing module or a processor of a terminal device, the terminal device is enabled to perform the method in any one of the first aspect or the possible implementations of the first aspect.

According to an eighth aspect, a communications chip is provided. An instruction is stored in the communications chip. When the instruction is run on a terminal device, the terminal device is enabled to perform the method in any one of the first aspect or the possible implementations of the first aspect.

According to a ninth aspect, a network device is provided. The network device includes a memory and a processor. The memory is configured to store an instruction. The processor is configured to execute the instruction stored in the memory, and the execution of the instruction stored in the memory enables the network device to perform the method in any one of the second aspect or the possible implementations of the second aspect.

According to a tenth aspect, a computer readable storage medium is provided. A computer program is stored in the computer readable storage medium. When the program is executed by a processor, the method in any one of the second aspect or the possible implementations of the second aspect is implemented.

According to an eleventh aspect, a computer program product is provided. The computer program product includes computer program code. When the computer program code is run by a processing module or a processor of a network device, the network device is enabled to perform the method in any one of the second aspect or the possible implementations of the second aspect.

According to a twelfth aspect, a communications chip is provided. An instruction is stored in the communications chip. When the instruction is run on a network device, the network device is enabled to perform the method in any one of the second aspect or the possible implementations of the second aspect.

DESCRIPTION OF EMBODIMENTS

Figure 1:
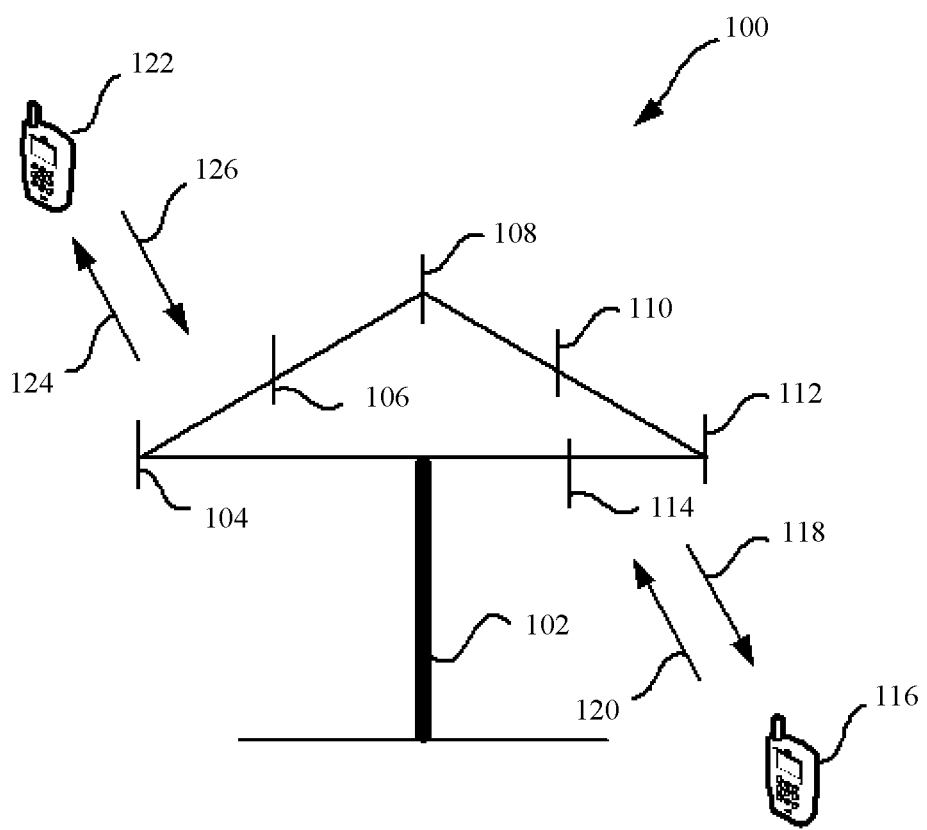
FIG. 1 is a schematic architectural diagram of a system according to an embodiment of this application.

The following describes technical solutions in this application with reference to accompanying drawings.

The technical solutions in embodiments of this application may be applied to various wireless communications systems, for example, a future 5th generation (5G) system or a new radio (NR) system.

A terminal device in the embodiments of this application is a device with a wireless receiving and sending function. The device may be deployed on land, for example, an indoor device or an outdoor device, a handheld device, a wearable device, or a vehicle-mounted device; may be deployed on water (e.g., on a ship); or may be deployed in air (e.g., on an airplane, a balloon, or a satellite). The terminal device may be a mobile phone, a tablet computer (Pad), a computer with a wireless receiving and sending function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a future 5G network, a terminal device in a future evolved public land mobile network (PLMN), or the like. An application scenario is not limited in the embodiments of this application. The terminal device sometimes may also be referred to as user equipment (UE), an access terminal device, a UE unit, a UE station, a mobile station, a mobile console, a remote station, a remote terminal device, a mobile device, a UE terminal device, a terminal, a wireless communications device, a UE agent, a UE apparatus, or the like.

A network device in the embodiments of this application may be a device that is configured to communicate with a terminal device. The network device may be any device with a wireless receiving and sending function, including but not limited to a base station (e.g., a NodeB NodeB, an evolved NodeB eNodeB, a base station in a 5th generation (5G) communications system, a base station or a network device in a future communications system, an access node in a Wi-Fi system, a wireless relay node, or a wireless backhaul node) and the like. The network device may be alternatively a radio controller in a cloud radio access network (CRAN) scenario. The network device may be alternatively a network device in a 5G network, a network device in a future evolved network, a wearable device, a vehicle-mounted device, or the like. The network device may be alternatively a small cell, a transmission reception point (TRP), or the like. Certainly, this application is not limited thereto.

For ease of understanding this application, several elements introduced in descriptions of this application are first described herein.

FIG. 1 is a schematic diagram of a wireless communications system according to an embodiment of this application. As shown in FIG. 1, the communications system 100 includes a network device 102, and the network device 102 may include one or more antennas, for example, antennas 104, 106, 108, 110, 112, and 114. In addition, the network device 102 may additionally include a transmitter chain and a receiver chain. It can be understood by a person of ordinary skill in the art that both the transmitter chain and the receiver chain may include a plurality of components that are related to signal sending and receiving (e.g., a processor, a modulator, a multiplexer, a demodulator, a demultiplexer, or an antenna).

The network device 102 may communicate with a plurality of terminal devices (e.g., a terminal device 116 and a terminal device 122). However, it can be understood that the network device 102 may communicate with any quantity of terminal devices similar to the terminal device 116 or the terminal device 122. Each of the terminal device 116 and the terminal device 122 may be any terminal device described above.

As shown in FIG. 1, the terminal device 116 communicates with the antenna 112 and the antenna 114. The antenna 112 and the antenna 114 send information to the terminal device 116 over a forward link (also referred to as a downlink) 118, and receive information from the terminal device 116 over a reverse link (also referred to as an uplink) 120. In addition, the terminal device 122 communicates with the antenna 104 and the antenna 106. The antenna 104 and the antenna 106 send information to the terminal device 122 over a forward link 124, and receive information from the terminal device 122 over a reverse link 126.

In addition, the communications system 100 may be a PLMN network, a D2D network, an M2M network, or another network. FIG. 1 is merely an example simplified schematic diagram. The network may further include another network device, which is not shown in FIG. 1.

Figure 2:
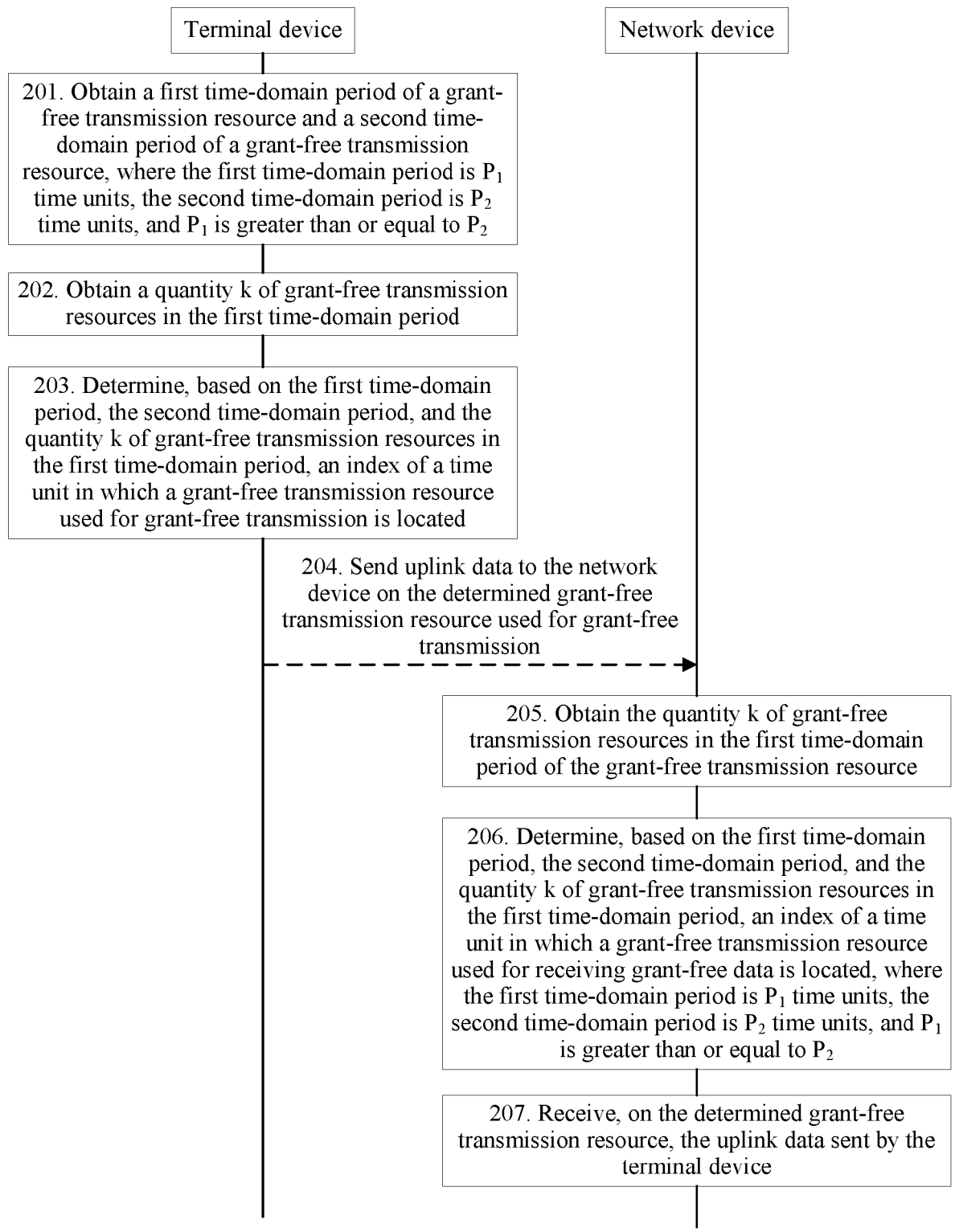
FIG. 2 is a schematic flowchart of a method for determining a time-domain resource used for grant-free transmission according to an embodiment of this application.

FIG. 2 is a schematic flowchart of a method 200 for determining a time-domain resource used for grant-free transmission according to an embodiment of this application. A terminal device in FIG. 2 may be one of the terminal device 116 and the terminal device 122 in FIG. 1, and a network device in FIG. 2 may be the network device 102 in FIG. 1. Certainly, in an actual system, a quantity of network devices and a quantity of terminal devices may not be limited to an example in this embodiment or another embodiment. Details are not described below. The method 200 includes at least the following steps.

201. The terminal device obtains a first time-domain period and a second time-domain period of grant-free transmission resources, where a size of the first time-domain period is $P_1$ time units, a size of the second time-domain period is $P_2$ time units, and $P_1$ is greater than or equal to $P_2$.

Specifically, when allocating grant-free transmission resources to the terminal device, the network device may configure the grant-free transmission resources for the terminal device based on dual periods (e.g., the first time-domain period and the second time-domain period). The first time-domain period includes $P_1$ time units, the second time-domain period includes $P_2$ time units, and $P_1$ is greater than or equal to $P_2$. In this application, one grant-free transmission resource may also be referred to as one grant-free transmission opportunity, which is a time-frequency resource used for one transmission of one data block, for example, one transport block (TB).

Figure 3:
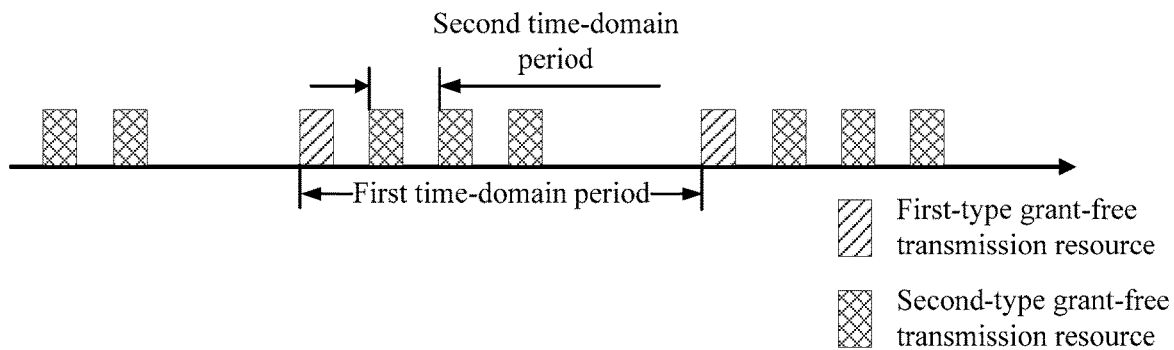
FIG. 3 is a schematic diagram of resource distribution of grant-free transmission resources configured based on dual periods according to an embodiment of this application.

For example, the network device configures a first-type grant-free transmission resource for the terminal device based on the first time-domain period, and configures a second-type grant-free transmission resource for the terminal device based on the second time-domain period. As shown in FIG. 3, in grant-free transmission resources configured by the network device for the terminal device, a first-type grant-free transmission resource appears repeatedly by the first time-domain period $P_1$, and a second-type grant-free transmission resource appears repeatedly by the second time-domain period $P_2$. The first grant-free transmission resource appearing in the first time-domain period $P_1$ is a first-type grant-free transmission resource, and a grant-free transmission resource configured based on the second time-domain period $P_2$ after the first grant-free transmission resource in the first time-domain period $P_1$ is a second-type grant-free transmission resource.

Optionally, the first-type grant-free transmission resource in the first time-domain period is used for initial transmission of a data packet of the terminal device, and the second-type grant-free transmission resource in the first time-domain period is used for non-initial transmission of the data packet. Therefore, the first time-domain period may also be referred to as a period of a grant-free transmission resource used for initial transmission, and the second time-domain period may also be referred to as a period of a grant-free transmission resource used for non-initial transmission.

When the terminal device determines the grant-free transmission resources allocated by the network device to the terminal device, the terminal device first needs to obtain parameter information related to the grant-free transmission resources, for example, to obtain the first time-domain period $P_1$ and the second time-domain period $P_2$ of the grant-free transmission resources, and determines, based on the parameter information related to the grant-free transmission resources, the grant-free transmission resources allocated by the network device to the terminal device.

Optionally, in addition to including the first time-domain period $P_1$ and the second time-domain period $P_2$, the parameter information may include at least a maximum quantity N of times of repeated transmission and a quantity T of time units included in any grant-free transmission resource in the first time-domain period. The maximum quantity N of times of repeated transmission is a maximum quantity of times of sending same uplink data to the network device before feedback information sent by the network device is received, where N≥1. In repeated transmission, a same redundancy version of same uplink data or different redundancy versions of same data may be transmitted at different times of transmission.

It should be noted that the maximum quantity N of times of repeated transmission is a maximum quantity of times of repeated transmission including initial transmission of the uplink data.

Optionally, any time unit included in any grant-free transmission resource in the first time-domain period and the second time-domain period may be any one of an orthogonal frequency division multiplexing (OFDM) symbol, a mini-slot, a slot, and a subframe.

Optionally, the parameter information may be notified by the network device to the terminal device in any one of the following manners. The parameter information may be notified by the network device to the terminal device by sending any one type of higher layer signaling (e.g., radio resource control (RRC) signaling) or L1/L2 signaling (e.g., downlink control information (DCI) or a media access control control element (MAC CE)). Alternatively, the parameter information may be pre-agreed on between the network device and the terminal device, for example, the parameter information is specified in a standard. Alternatively, the parameter information may be a default value. This is not particularly limited in this embodiment of this application.

202. The terminal device obtains a quantity k of grant-free transmission resources in the first time-domain period that are configured based on the first time-domain period $P_1$ and the second time-domain period $P_2$.

Specifically, in 201, the terminal device determines the first time-domain period $P_1$ and the second time-domain period $P_2$ of the grant-free transmission resources; and in 202, the terminal device needs to further determine the quantity k of grant-free transmission resources included in the first time-domain period.

In this embodiment, the grant-free transmission resources included in the first time-domain period are a grant-free transmission resource configured based on the first time-domain period $P_1$ and a grant-free transmission resource configured based on the second time-domain period $P_2$. The k grant-free transmission resources include one grant-free transmission resource configured based on the first time-domain period and (k−1) grant-free transmission resources configured based on the second time-domain period.

203. The terminal device determines, based on the first time-domain period, the second time-domain period, and the quantity k of grant-free transmission resources in the first time-domain period, an index of a time unit in which a grant-free transmission resource used for grant-free transmission is located.

Specifically, in 202, the terminal device determines the quantity k of grant-free transmission resources included in the first time-domain period; and in 203, the terminal device determines, based on the first time-domain period, the second time-domain period, and the quantity k of grant-free transmission resources in the first time-domain period, the index of the time unit in which the grant-free transmission resource used for grant-free transmission is located.

Therefore, in this embodiment of this application, the quantity k of grant-free transmission resources in the first time-domain period is determined, and the terminal device determines, based on the first time-domain period, the second time-domain period, and the quantity k of grant-free transmission resources in the first time-domain period, the index of the time unit in which the grant-free transmission resource used for grant-free transmission is located. In this way, grant-free transmission resources configured for the terminal device in two adjacent first time-domain periods do not overlap.

The following describes in detail a method for determining, by the terminal device, the quantity k of grant-free transmission resources included in the first time-domain period.

By way of example but not limitation, that any grant-free transmission resource in the first time-domain period includes one time unit is used as an example to describe the method for determining the quantity k of grant-free transmission resources included in the first time-domain period.

Method 1

The terminal device determines the quantity k of grant-free transmission resources in the first time-domain period based on the first time-domain period $P_1$ and the second time-domain period $P_2$.

Specifically, the terminal device determines the quantity k of grant-free transmission resources in the first time-domain period according to the following relational expression:

$$k=\text{ceil}(P_1/P_2) \quad (1),$$

where ceil means rounding up.

For example, if a quantity of time units included in the first time-domain period $P_1$ is 5, and a quantity of time units included in the second time-domain period is 2, the quantity k of grant-free transmission resources in the first time-domain period determined according to the relational expression (1) is as follows:

$$k=\text{ceil}(5/2)=3.$$

Figure 4:
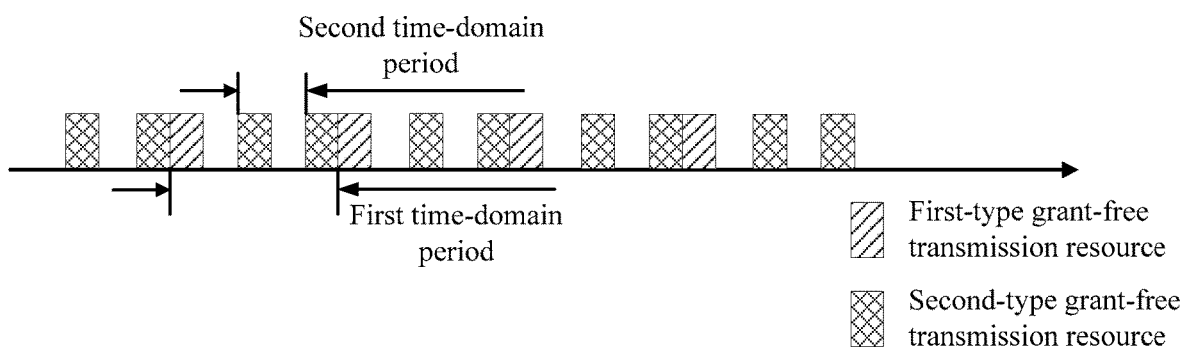
FIG. 4 is a schematic diagram of resource distribution of grant-free transmission resources according to an embodiment of this application.

In other words, it is determined that the quantity of grant-free transmission resources in the first time-domain period is 3, and a schematic diagram of grant-free transmission resource distribution is shown in FIG. 4.

Method 2

The terminal device determines the quantity k of grant-free transmission resources in the first time-domain period based on the first time-domain period $P_1$, the second time-domain period $P_2$, and the quantity T of time units included in any grant-free transmission resource in the first time-domain period.

Specifically, the terminal device determines the quantity k of grant-free transmission resources in the first time-domain period according to the following relational expression:

$$k=\text{floor}[(P_1-T)/P_2]+1 \quad (2),$$

where floor means rounding down.

For example, if a quantity of time units included in the first time-domain period $P_1$ is 8, and a quantity of time units included in the second time-domain period is 3, the quantity k of grant-free transmission resources in the first time-domain period determined according to the relational expression (2) is as follows:

$$k=\text{floor}[(8-1)/3]+1=3.$$

Figure 5:
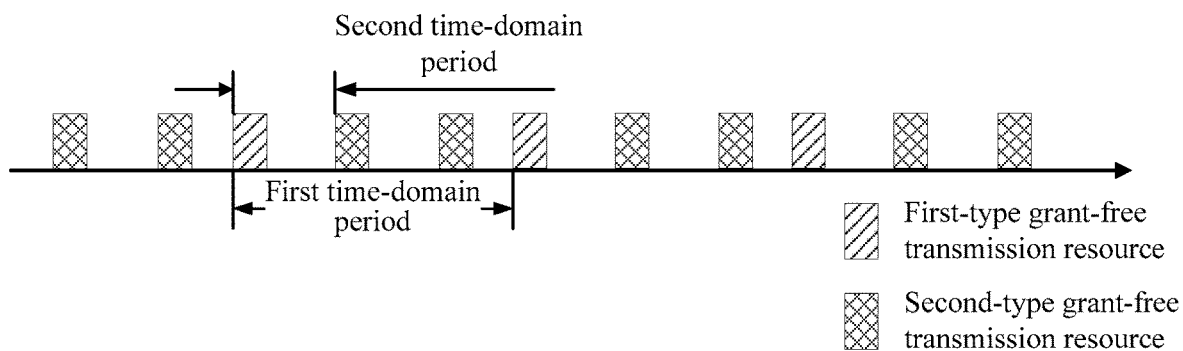
FIG. 5 is another schematic diagram of resource distribution of grant-free transmission resources according to an embodiment of this application.

In other words, it is determined that the quantity of grant-free transmission resources in the first time-domain period is 3, and a schematic diagram of grant-free transmission resource distribution is shown in FIG. 5.

Method 3

The terminal device determines the quantity k of grant-free transmission resources in the first time-domain period based on the first time-domain period, the second time-domain period, and the maximum quantity N of times of repeated transmission.

Specifically, the terminal device determines the quantity k of grant-free transmission resources in the first time-domain period according to the following relational expression:

$$k=\min[\text{ceil}(P_1/P_2),N] \quad (3),$$

where the function min means returning a minimum value of the given parameter $[\text{ceil}(P_1/P_2), N]$.

For example, if a quantity of time units included in the first time-domain period $P_1$ is 8, a quantity of time units included in the second time-domain period is 2, and the maximum quantity N of times of repeated transmission is 4, the quantity k of grant-free transmission resources in the first time-domain period determined according to the relational expression (3) is as follows:

$$k=\min[\text{ceil}(8/2),N]=4.$$

Figure 6:
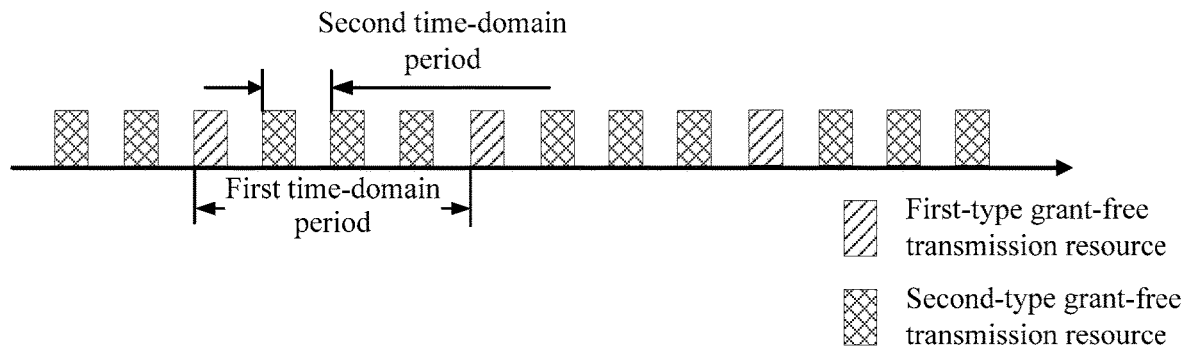
FIG. 6 is still another schematic diagram of resource distribution of grant-free transmission resources according to an embodiment of this application.

In other words, it is determined that the quantity of grant-free transmission resources in the first time-domain period is 4, and a schematic diagram of grant-free transmission resource distribution is shown in FIG. 6.

Method 4

The terminal device determines the quantity k of grant-free transmission resources in the first time-domain period based on the first time-domain period, the second time-domain period, the quantity T of time units included in any grant-free transmission resource in the first time-domain period, and the maximum quantity N of times of repeated transmission.

Specifically, the terminal device determines the quantity k of grant-free transmission resources in the first time-domain period according to the following relational expression:

$$k=\min[\text{floor}[(P_1-T)/P_2]+1,N] \quad (4).$$

For example, if a quantity of time units included in the first time-domain period $P_1$ is 10, a quantity of time units included in the second time-domain period is 2, and the maximum quantity N of times of repeated transmission is 4, the quantity k of grant-free transmission resources in the first time-domain period determined according to the relational expression (4) is as follows:

$$k=\min[\text{floor}[(10-1)/2]+1,N]=4.$$

Figure 7:
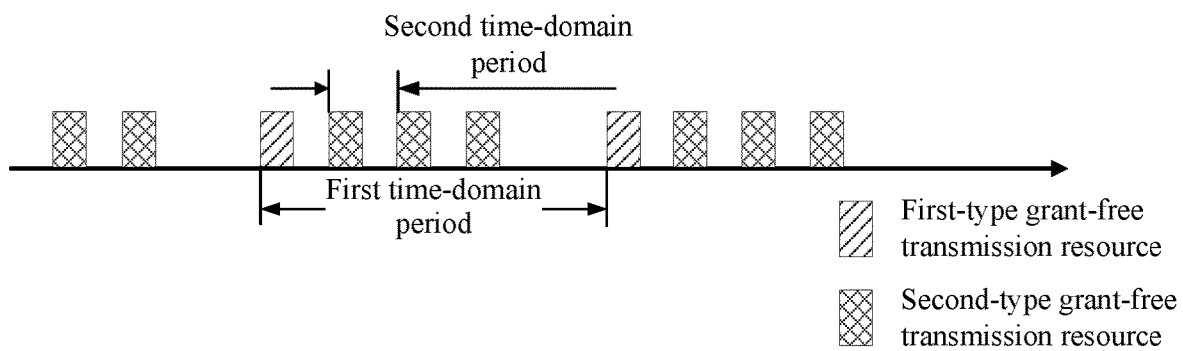
FIG. 7 is still another schematic diagram of resource distribution of grant-free transmission resources according to an embodiment of this application.

In other words, it is determined that the quantity of grant-free transmission resources in the first time-domain period is 4, and a schematic diagram of grant-free transmission resource distribution is shown in FIG. 7.

For the method 3 and the method 4, N in the relational expression (3) and the relational expression (4) may be replaced with another parameter. For example, N in the relational expression (3) and the relational expression (4) may be replaced with L, where L is used to indicate that (L-1) second-type grant-free transmission resources are configured after the first-type grant-free transmission resource in the first time-domain period.

A replacement form of the relational expression (3) is shown in a relational expression (5):

$$k=\min[\text{ceil}(P_1/P_2),L] \quad (5).$$

A replacement form of the relational expression (4) is shown in a relational expression (6):

$$k=\min[\text{floor}[(P_1-T)/P_2]+1,L] \quad (6).$$

Optionally, the parameter L may be notified by the network device to the terminal device in any one of the following manners. The parameter L may be notified by the network device to the terminal device by sending any one type of higher layer signaling (e.g., RRC signaling), L1/L2 signaling (e.g., DCI), or a MAC CE. Alternatively, the parameter L may be pre-agreed on between the network device and the terminal device. Alternatively, the parameter L may be a default value. This is not particularly limited in this embodiment of this application.

Method 5

The terminal device determines, based on the second time-domain period, the quantity k of grant-free transmission resources allocated by the network device to the terminal device.

Specifically, after the first-type grant-free transmission resource in the current first time-domain period, the terminal device determines a quantity of second-type grant-free transmission resources based on the second time-domain period $P_2$; and when a determined second-type grant-free transmission resource is located in a first time-domain period following the current first time-domain period, ignores or discards the determined second-type grant-free transmission resource located in the first time-domain period following the current first time-domain period.

Figure 8:
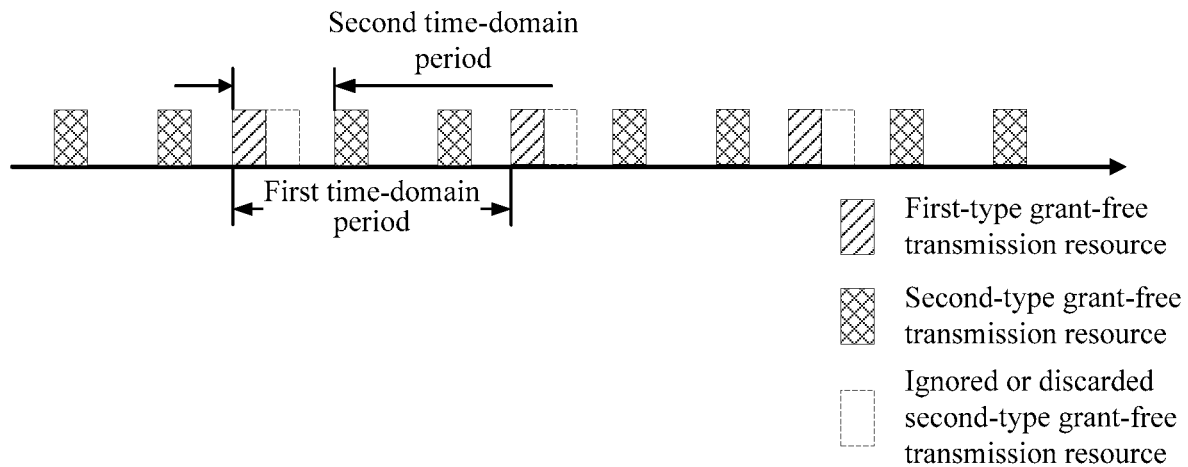
FIG. 8 is still another schematic diagram of resource distribution of grant-free transmission resources according to an embodiment of this application.

For example, as shown in FIG. 8, if a quantity of time units included in the first time-domain period $P_1$ is 8, and a quantity of time units included in the second time-domain period is 3, the terminal device determines, based on a size of the second time-domain period, that one first time-domain period can include only two second-type grant-free transmission resources, and the terminal device ignores or discards a second-type grant-free transmission resource located in the first time-domain period following the current first time-domain period. Second-type grant-free transmission resources ignored or discarded by the terminal device are shown in FIG. 8.

It should be noted that the relational expressions listed in the foregoing methods are merely example descriptions, and do not constitute any limitation on this embodiment of this application.

By way of example but not limitation, that any grant-free transmission resource in the first time-domain period includes one time unit and the time unit is a mini-slot is used as an example to describe the method for determining the quantity k of grant-free transmission resources included in the first time-domain period.

It should be noted that, when any time unit included in any grant-free transmission resource in the first time-domain period is a mini-slot, in addition to obtaining the foregoing parameter information, the terminal device further needs to determine format information of the mini-slot. The format information of the mini-slot includes at least a quantity of orthogonal frequency division multiplexing OFDM symbols included in each mini-slot and a location of a starting OFDM symbol of each mini-slot in each slot, or includes a location of a starting OFDM symbol of each mini-slot in each slot and a location of an end OFDM symbol of each mini-slot in each slot.

The following describes several methods for determining, by the terminal device, the format information of the mini-slot and determining, by the terminal device based on the format information of the mini-slot, the quantity k of grant-free transmission resources included in the first time-domain period.

Method 1

The network device pre-defines a plurality of formats of the mini-slot, and delivers, to the terminal device, a mini-slot format number corresponding to the mini-slot, so that the terminal device determines a format of the mini-slot.

Each format of the mini-slot represents a distribution status of the mini-slot in a slot. The distribution status may be a quantity of orthogonal frequency division multiplexing OFDM symbols included in each mini-slot and a location of a starting OFDM symbol of each mini-slot in each slot, or may be a location of a starting OFDM symbol of each mini-slot in each slot and a location of an end OFDM symbol of each mini-slot in each slot.

Format 1

As shown in Table 1, the format information of the mini-slot includes at least the following information: an index of a starting OFDM symbol of each mini-slot and a quantity of symbols occupied by each mini-slot.

TABLE 1

| Mini-slot format number | Index of a starting OFDM symbol | Quantity of symbols occupied by each mini-slot |
| --- | --- | --- |
| B | $I_1, I_2, \ldots,$ and $I_X$ | $n_1, n_2, \ldots,$ and $n_X$ |

The first column in Table 1 represents the mini-slot format number. When the network device notifies the terminal device of a determined format of the mini-slot, the network device only needs to deliver the format number to the terminal device. The second column in Table 1 indicates that one slot includes X (X is a positive integer greater than 1) mini-slots, and indicates that an index of a starting OFDM symbol of the $i^{th}$ mini-slot in a slot is $I_i$ ($0 \leq I_i \leq 13$, and $1 \leq i \leq X$). The third column in Table 1 represents the quantity of OFDM symbols occupied by each mini-slot, where $n_i$ ($0 \leq n_i \leq 14$, and $1 \leq i \leq X$) represents a quantity of OFDM symbols occupied by the $i^{th}$ mini-slot whose starting OFDM symbol has the index $I_i$.

Figure 9:
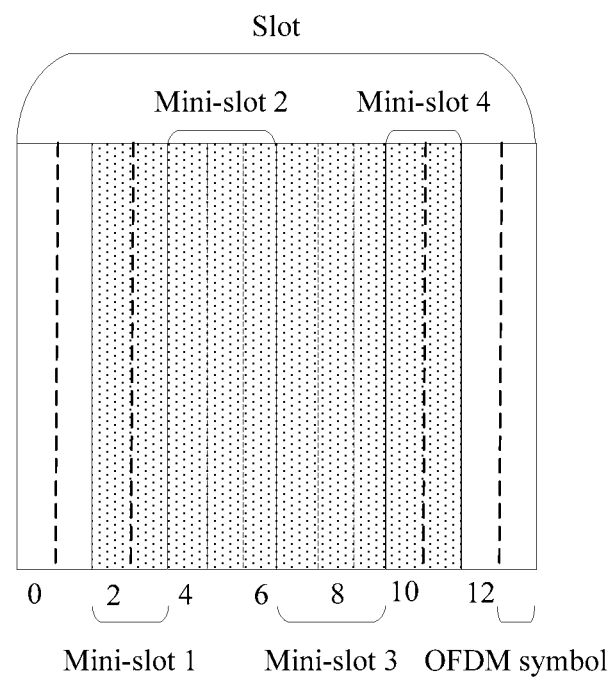
FIG. 9 is a schematic diagram of resource distribution of mini-slots included in a slot according to an embodiment of this application.

For example, when the mini-slot format number B in Table 1 is 2, a corresponding format of the mini-slot is shown in Table 2, and a corresponding schematic distribution diagram of mini-slots in one slot is shown in FIG. 9.

TABLE 2

| Mini-slot format number | Index of a starting OFDM symbol | Quantity of symbols occupied by each mini-slot |
| --- | --- | --- |
| 2 | 2, 4, 7, and 10 | 2, 3, 3, and 2 |

Format 2

As shown in Table 3, the format information of the mini-slot includes at least the following information: an index of a starting OFDM symbol of each mini-slot and a quantity of symbols occupied by each mini-slot.

TABLE 3

| Mini-slot format number | Index of a starting OFDM symbol | Quantity of symbols occupied by each mini-slot |
| --- | --- | --- |
| B | $I_1, I_2, \ldots,$ and $I_X$ | n |

The first column in Table 3 represents the mini-slot format number. When the network device notifies the terminal device of a determined format of the mini-slot, the network device only needs to deliver the format number to the terminal device. The second column in Table 3 indicates that one slot includes X (X is a positive integer greater than 1) mini-slots, and indicates that an index of a starting OFDM symbol of the $i^{th}$ mini-slot in a slot is $I_i$ ($0 \le I_i \le 13$, and $1 \le i \le X$). The third column in Table 3 indicates that the quantity of symbols occupied by each mini-slot, namely, the quantity of OFDM symbols occupied by each of the X mini-slots is n.

Figure 10:
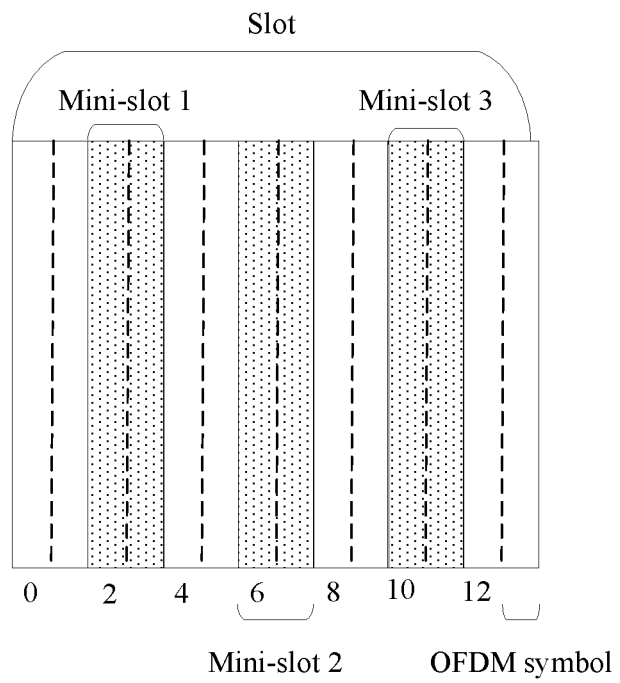
FIG. 10 is another schematic diagram of resource distribution of mini-slots included in a slot according to an embodiment of this application.

For example, when the mini-slot format number B in Table 3 is 2, a corresponding format of the mini-slot is shown in Table 4, and a corresponding schematic distribution diagram of mini-slots in one slot is shown in FIG. 10.

TABLE 4

| Mini-slot format number | Index of a starting OFDM symbol | Quantity of symbols occupied by each mini-slot |
|---|---|---|
| 2 | 2, 6, and 10 | 2 |

Format 3

As shown in Table 5, the format information of the mini-slot includes at least the following information: an index of a starting OFDM symbol of each mini-slot and an index of an end OFDM symbol of each mini-slot.

TABLE 5

| Mini-slot format number | Index of a starting OFDM symbol | Index of an end OFDM symbol |
|---|---|---|
| B | $I_1, I_2, \ldots$, and $I_X$ | $E_1, E_2, \ldots$, and $E_X$ |

The first column in Table 5 represents the mini-slot format number. When the network device notifies the terminal device of a determined format of the mini-slot, the network device only needs to deliver the format number to the terminal device. The second column in Table 5 indicates that one slot includes X (X is a positive integer greater than 1) mini-slots, and indicates that an index of a starting OFDM symbol of the $i^{th}$ mini-slot in a slot is $I_i$ ($0 \le I_i \le 13$, and $1 \le i \le X$). The third column in Table 5 represents the index of the end OFDM symbol of each mini-slot, where $E_i$ ($0 \le E_i \le 14$, and $1 \le i \le X$) represents an index of an end OFDM symbol of the $i^{th}$ mini-slot whose starting OFDM symbol has the index $I_i$.

Figure 11:
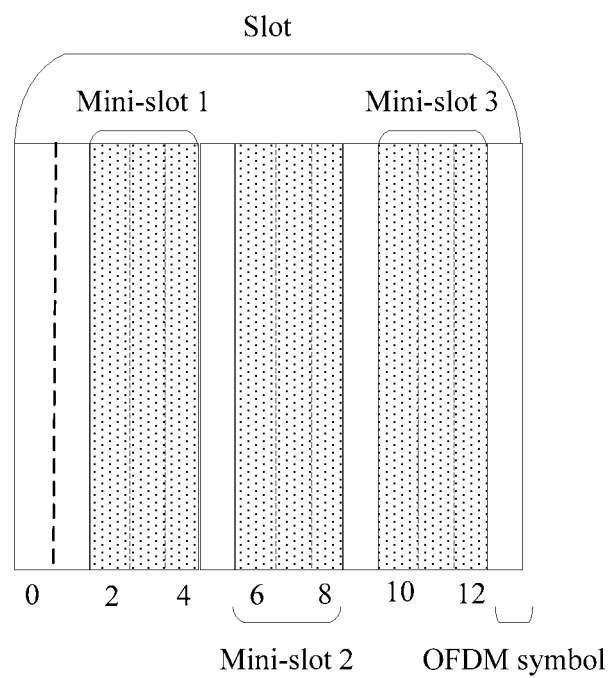
FIG. 11 is still another schematic diagram of resource distribution of mini-slots included in a slot according to an embodiment of this application.

For example, when the mini-slot format number B in Table 5 is 2, a corresponding format of the mini-slot is shown in Table 6, and a corresponding schematic distribution diagram of mini-slots in one slot is shown in FIG. 11.

TABLE 6

| Mini-slot format number | Index of a starting OFDM symbol | Index of an end OFDM symbol |
|---|---|---|
| 2 | 2, 6, and 10 | 4, 8, and 12 |

Format 4

As shown in Table 7, the format information of the mini-slot includes at least the following information: an index of a starting OFDM symbol of an initial mini-slot, a quantity of occupied symbols, and a period by which a mini-slot repeatedly appears in one slot or an interval between two adjacent mini-slots in one slot.

TABLE 7

| Mini-slot format number | Index of a starting OFDM symbol of an initial mini-slot | Quantity of symbols occupied by a mini-slot | Mini-slot period or interval |
|---|---|---|---|
| B | $I_{symbol}$ | $n_{symbol}$ | $p_{symbol}$ |

The first column in Table 7 represents the mini-slot format number. When the network device notifies the terminal device of a determined format of the mini-slot, the network device only needs to deliver the format number to the terminal device. The second column in Table 7 indicates that the index of the starting OFDM symbol of the initial mini-slot in the slot is $I_{symbol}$ ($0 \le I_{symbol} \le 13$). The third column in Table 7 indicates that the quantity of symbols occupied by the mini-slot is $n_{symbol}$ ($0 \le n_{symbol} \le 14$). The fourth column in Table 7 represents the period by which a mini-slot repeatedly appears in one slot or the interval between two adjacent mini-slots.

Figure 12:
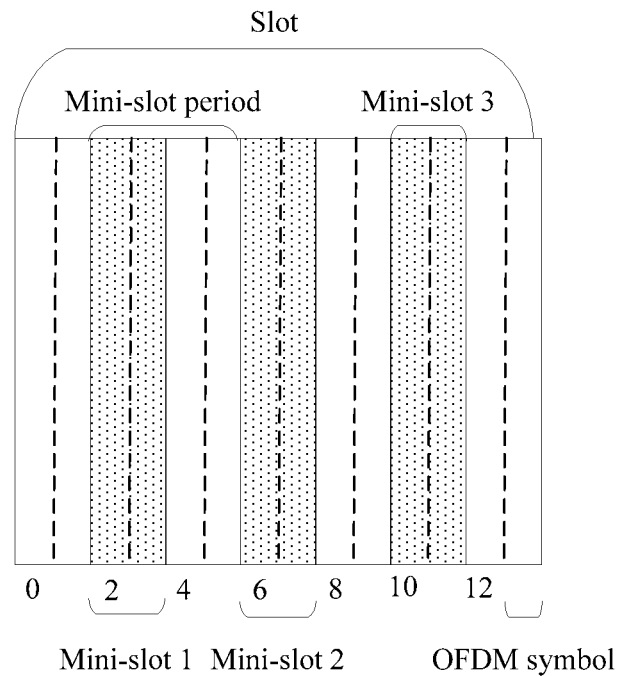
FIG. 12 is still another schematic diagram of resource distribution of mini-slots included in a slot according to an embodiment of this application.

For example, when the mini-slot format number B in Table 7 is 2, and the fourth column in Table 7 represents the period by which a mini-slot repeatedly appears in one slot, a corresponding format of the mini-slot is shown in Table 8, and a corresponding schematic distribution diagram of mini-slots in one slot is shown in FIG. 12.

TABLE 8

| Mini-slot format number | Index of a starting OFDM symbol of an initial mini-slot | Quantity of symbols occupied by a mini-slot | Mini-slot period |
|---|---|---|---|
| 2 | 2 | 2 | 4 |

Figure 13:
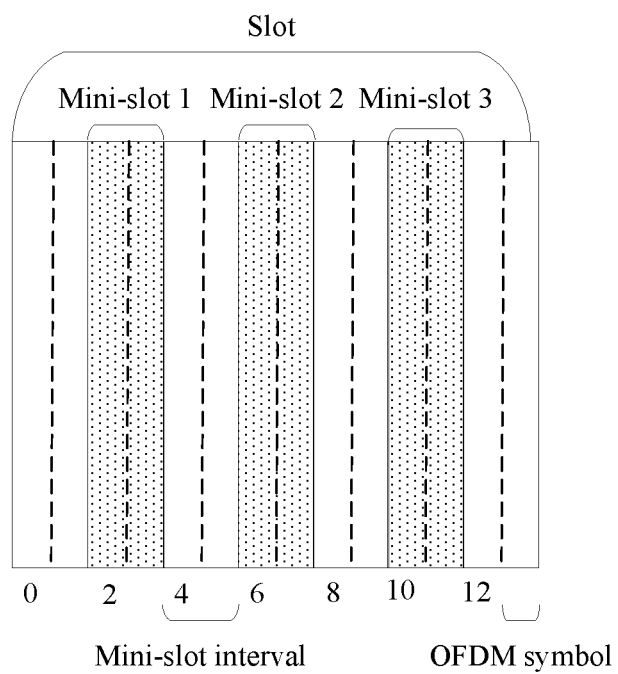
FIG. 13 is still another schematic diagram of resource distribution of mini-slots included in a slot according to an embodiment of this application.

For another example, when the mini-slot format number B in Table 7 is 2, and the fourth column in Table 7 represents the interval between two adjacent mini-slots in one slot, a corresponding format of the mini-slot is shown in Table 9, and a corresponding schematic distribution diagram of mini-slots in one slot is shown in FIG. 13.

TABLE 9

| Mini-slot format number | Index of a starting OFDM symbol of an initial mini-slot | Quantity of symbols occupied by a mini-slot | Interval between two adjacent mini-slots |
|---|---|---|---|
| 2 | 2 | 2 | 2 |

In the method 1, the format of the mini-slot may be specified in a standard. The network device determines the format of the mini-slot, and delivers the mini-slot format number to the terminal device, so that the terminal device determines the format of the mini-slot based on the number. This embodiment of this application is not limited thereto.

For example, alternatively, the network device may directly configure the format of the mini-slot in the slot, and send specific configured format information (e.g., the format information described in the foregoing table) of the mini-slot to the terminal device by using any one of the following types of signaling: higher layer signaling (e.g., RRC signaling), L1/L2 signaling (e.g., DCI), or a MAC CE.

Alternatively, the format of the mini-slot in the slot may be pre-agreed on between the network device and the terminal device (that is, the format is agreed on in a standard observed by the network device and the terminal device), or the format is a default format.

After the terminal device determines the format information of the mini-slot that is configured by the network device for the terminal device, the terminal device may further determine the quantity k of grant-free transmission resources included in the first time-domain period.

Specifically, the network device notifies the terminal device of the first time-domain period, the second time-domain period, and the mini-slot format number. For example, if the network device notifies the terminal device that the first time-domain period includes seven mini-slots and the second time-domain period includes two mini-slots, and notifies the terminal device that the format of the mini-slot is that each mini-slot occupies two OFDM symbols, the terminal device determines, according to the relational expression (1), that the quantity k of grant-free transmission resources included in the first time-domain period is as follows:

$k=\text{ceil}(7/2)=4.$

It should be noted that, if the network device does not indicate a size of the first time-domain period to the terminal device, when the terminal device determines the quantity of grant-free transmission resources, the size of the first time-domain period is, by default, a quantity of mini-slots included in one slot.

Method 2

The network device delivers the format information of the mini-slot by using a grant-free time-domain resource allocation parameter, and the format information of the mini-slot is used to indicate a selected or determined format of the mini-slot.

Optionally, the format information of the mini-slot includes at least a quantity of orthogonal frequency division multiplexing OFDM symbols included in each mini-slot and a location of a starting OFDM symbol of each mini-slot in each slot, or includes a location of a starting OFDM symbol of each mini-slot in each slot and a location of an end OFDM symbol of each mini-slot in each slot.

Specifically, the network device delivers a time-domain resource offset parameter, and the time-domain resource offset parameter is used to indicate an index of a time unit (e.g., a slot) in which a configured initial grant-free transmission resource is located, or is used to indicate an index of a time unit for grant-free transmission resource initialization.

For example, the terminal device considers that, starting from a location of a slot indicated by the time-domain resource offset parameter, grant-free transmission resources are configured in all slots following the slot, and grant-free transmission resources are configured in all mini-slots in a slot indicated by the format information of the mini-slot.

For another example, the network device delivers a grant-free transmission resource time-domain period, the time-domain period is a period by which a slot in which a grant-free transmission resource is configured repeatedly appears in time domain, and the terminal device considers that, starting from a location of a slot indicated by the time-domain resource offset parameter, a grant-free transmission resource is configured in only a slot that appears by a period indicated by the grant-free transmission resource time-domain period, and grant-free transmission resources are configured in all mini-slots in the slot indicated by the format information of the mini-slot.

It should be noted that the mini-slot format number or all parameters may be notified by the network device to the terminal device in any one of the following manners. The mini-slot format number or all the parameters may be notified by the network device to the terminal device by sending any one type of higher layer signaling (e.g., RRC signaling), L1/L2 signaling (e.g., DCI), or a MAC CE. Alternatively, the mini-slot format number or all the parameters may be pre-agreed on between the network device and the terminal device. This is not particularly limited in this embodiment of this application.

In step 202, the terminal device determines the quantity k of grant-free transmission resources in the first time-domain period. To perform uplink transmission by using the grant-free transmission resource that is allocated by the network device to the terminal device, the terminal device further needs to determine the index of the time unit in which the grant-free transmission resource is located.

The following describes a method for determining, by the terminal device, the index of the time unit in which the grant-free transmission resource that is configured by the network device for the terminal device is located.

Optionally, the terminal device determines, based on the index of the time unit in which the first grant-free transmission resource is located, the first time-domain period, the second time-domain period, and the quantity k of grant-free transmission resources in the first time-domain period, the index of the time unit in which the grant-free transmission resource is located.

It should be noted that, when any grant-free transmission resource in the first time-domain period includes a plurality of time units, an index of a time unit in which the grant-free transmission resource is located is an index of an initial time unit in the plurality of time units included in the grant-free transmission resource.

For example, when any grant-free transmission resource in the first time-domain period includes a plurality of OFDM symbols, an index of a time unit in which the grant-free transmission resource is located is an index of an initial OFDM symbol in the plurality of OFDM symbols.

It should also be noted that the index of the time unit in which the first grant-free transmission resource is located is used for grant-free transmission resource initialization, and the index is denoted as Starting_index. The index of the time unit in which the first grant-free transmission resource is located may be notified by the network device to the terminal device in at least any one of the following manners. The index of the time unit in which the first grant-free transmission resource is located may be notified by the network device to the terminal device by sending any one type of higher layer signaling (e.g., RRC signaling), L1/L2 signaling (e.g., DCI), or a MAC CE. Alternatively, the index of the time unit in which the first grant-free transmission resource is located may be pre-agreed on between the network device and the terminal device, for example, the index is specified in a standard. Alternatively, the index of the time unit in which the first grant-free transmission resource is located may be a default value. This is not particularly limited in this embodiment of this application.

By way of example but not limitation, the terminal device determines an index of a time unit in which a grant-free transmission resource Y is located, according to any one of the following relational expressions:

$$\text{TU\_index}=\text{Starting\_index}+\text{floor}(Y/k)*P_1+(Y \bmod k)*P_2 \qquad (7);$$

$$TU\_index=[Starting\_index+floor(Y/k)*P_1+(Y \bmod k)*P_2] \bmod X \quad (8);$$

$$TU\_index=Starting\_index+floor(Y/k)*P_1+(Y \bmod k)*P_2+F_2 \quad (9);$$

and $$TU\_index=[Starting\_index+floor(Y/k)*P_1+(Y \bmod k)*P_2+F_2] \bmod X \quad (10),$$

where $F_2$ represents a correction parameter, and a value of $F_2$ is related to a value of Y;

Y is a nonnegative integer, and is used to indicate a sequence number of a grant-free transmission resource;

X is a preset nonnegative integer;

Starting_index represents the index of the time unit in which the first grant-free transmission resource is located; and TU_index represents an index of a time unit in which any grant-free transmission resource including the first grant-free transmission resource is located.

By way of example but not limitation, the terminal device may further determine, according to any one of the following relational expressions, an index of a time unit in which a grant-free transmission resource (D*k+e) is located, where D represents a sequence number of the first time-domain period, k represents a quantity of grant-free transmission resources included in each first time-domain period, e is a nonnegative integer, and 0≤e≤(k−1). For any value of D, a value of e traverses 0 to (k−1).

$$TU\_index=Starting\_index+D*P_1+e*P_2 \quad (11);$$

$$TU\_index=[Starting\_index+D*P_1+e*P_2] \bmod X \quad (12);$$

$$TU\_index=Starting\_index+D*P_1+e*P_2+F_2 \quad (13);$$

and $$TU\_index=[Starting\_index+D*P_1+e*P_2+F_2] \bmod X \quad (14),$$

where $F_2$ represents a correction parameter, and a value of $F_2$ is related to a value of (D*k+e);

X is a preset nonnegative integer;

Starting_index represents the index of the time unit in which the first grant-free transmission resource is located; and TU_index represents an index of a time unit in which any grant-free transmission resource including the first grant-free transmission resource is located.

It should be noted that TU_index calculated according to the relational expressions (7) to (14) is a global index of a time unit. In this application, both a local index of a time unit and a global index of a time unit can indicate a location of a time unit, and each of the local index and the global index may be referred to as an index of a time unit.

When the time unit is specifically an OFDM symbol, a global index of the OFDM symbol is determined based on a frame number of a radio frame in which the OFDM symbol is located, an index, in the radio frame, of a subframe in which the OFDM symbol is located, an index, in the subframe, of a slot in which the OFDM symbol is located, an index of the OFDM symbol in the slot, a quantity of subframes included in one radio frame, a quantity of slots included in one subframe, and a quantity of symbols included in one slot. A local index of the OFDM symbol is represented jointly by the frame number of the radio frame in which the OFDM symbol is located, the index, in the frame, of the subframe in which the OFDM symbol is located, the index, in the subframe, of the slot in which the OFDM symbol is located, and the index of the OFDM symbol in the slot.

When the time unit is specifically a slot, a global index of the slot is determined based on a frame number of a radio frame in which the slot is located, an index, in the radio frame, of a subframe in which the slot is located, an index of the slot in the subframe, a quantity of subframes included in one radio frame, and a quantity of slots included in one subframe. A local index of the slot is represented jointly by the frame number of the radio frame in which the slot is located, the index, in the frame, of the subframe in which the slot is located, and the index of the slot in the subframe.

When the time unit is specifically a mini-slot, a global index of the mini-slot is determined based on a frame number of a radio frame in which the mini-slot is located, an index, in the radio frame, of a subframe in which the mini-slot is located, an index, in the subframe, of a slot in which the mini-slot is located, an index of the mini-slot in the slot, a quantity of subframes included in one radio frame, a quantity of slots included in one subframe, and a quantity of mini-slots included in one slot. A local index of the mini-slot is represented jointly by the frame number of the radio frame in which the mini-slot is located, the index, in the radio frame, of the subframe in which the mini-slot is located, the index, in the subframe, of the slot in which the mini-slot is located, and the index of the mini-slot in the slot.

In a communications system, when there are three levels of time-domain resources: a radio frame, a slot, and a symbol, a local index of a time unit and a global index of a time unit may be alternatively as follows:

When the time unit is specifically an OFDM symbol, a global index of the OFDM symbol is determined based on a frame number of a radio frame in which the OFDM symbol is located, an index, in the radio frame, of a slot in which the OFDM symbol is located, an index of the OFDM symbol in the slot, a quantity of slots included in one radio frame, and a quantity of symbols included in one slot. A local index of the OFDM symbol is represented jointly by the frame number of the radio frame in which the OFDM symbol is located, the index, in the radio frame, of the slot in which the OFDM symbol is located, and the index of the OFDM symbol in the slot.

When the time unit is specifically a slot, a global index of the slot is determined based on a frame number of a radio frame in which the slot is located, an index of the slot in the radio frame, and a quantity of slots included in one radio frame. A local index of the slot is represented jointly by the frame number of the radio frame in which the slot is located and the index of the slot in the radio frame.

When the time unit is specifically a mini-slot, a global index of the mini-slot is determined based on a frame number of a radio frame in which the mini-slot is located, an index, in the radio frame, of a slot in which the mini-slot is located, an index of the mini-slot in the slot, a quantity of slots included in one radio frame, and a quantity of mini-slots included in one slot. A local index of the mini-slot is represented jointly by the frame number of the radio frame in which the mini-slot is located, the index, in the radio frame, of the slot in which the mini-slot is located, and the index of the mini-slot in the slot.

The following describes a method for determining a local index corresponding to Starting_index and TU_index, with regard to different types of time units. It is assumed that each radio frame includes M_subframe subframes, each subframe includes M_slot slots, each slot includes M_mini-slot mini-slots, and each slot includes M_symbol OFDM symbols. Indexes subframe_index of the M_subframe subframes in one frame are 0, 1, . . . , and M_subframe−1; indexes slot_index of the M_slot slots in one subframe are 0, 1, . . . , and M_slot−1; indexes mini-slot_index of the M_mini-slot mini-slots in one slot are 0, 1, . . . , and M_mini-slot−1; and indexes symbol_index of the M_symbol symbols in one slot are 0, 1, . . . , and M_symbol−1.

M_subframe, M_slot, M_mini-slot, and M_symbol may be notified by the network device to the terminal device in any one of the following manners. M_subframe, M_slot, M_mini-slot, and M_symbol may be notified by the network device to the terminal device by sending any one type of higher layer signaling (e.g., RRC signaling), L1/L2 signaling (e.g., DCI), or a MAC CE. Alternatively, M_subframe, M_slot, M_mini-slot, and M_symbol may be pre-agreed on between the network device and the terminal device. Alternatively, M_subframe, M_slot, M_mini-slot, and M_symbol may be default values. This is not particularly limited in this embodiment of this application.

By way of example but not limitation, when any grant-free transmission resource in the first time-domain period includes one or more time units, and the time unit is a slot, TU_index may be further expressed as:

$$\text{TU\_index}=\text{SFN}*M\_\text{subframe}*M\_\text{slot}+\text{subframe\_index}*M\_\text{slot}+\text{slot\_index} \quad (15),$$

where

SFN represents a system frame number of a radio frame in which a slot with the index slot_index is located, and subframe_index represents an index of a subframe in which the slot with the index slot_index is located.

Starting_index may be further expressed as:

$$\text{Starting\_index}=\text{SFN\_Starting}*M\_\text{subframe}*M\_\text{slot}+\text{subframe\_index\_Starting}*M\_\text{slot}+\text{slot\_index\_Starting} \quad (16),$$

where slot_index_Starting represents an index of a slot in which the first grant-free transmission resource is located, subframe_index_Starting represents an index of a subframe in which the slot with the index slot_index_Starting is located, and SFN_Starting represents a system frame number of a radio frame in which the slot with the index slot_index_Starting is located.

By way of example but not limitation, when any grant-free transmission resource in the first time-domain period includes one or more time units, and the time unit is a mini-slot, TU_index may be further expressed as:

$$\text{TU\_index}=\text{SFN}*M\_\text{subframe}*M\_\text{slot}*M\_\text{mini-slot}+\text{subframe\_index}*M\_\text{slot}*M\_\text{mini-slot}+\text{slot\_index}*M\_\text{mini-slot}+\text{mini-slot\_index} \quad (17),$$

where

SFN represents a system frame number of a radio frame in which a mini-slot with the index mini-slot_index is located, subframe_index represents an index of a subframe in which the mini-slot with the index mini-slot_index is located, and slot_index represents an index of a slot in which the mini-slot with the index mini-slot_index is located.

Starting_index may be further expressed as:

$$\text{Starting\_index}=\text{SFN\_Starting}*M\_\text{subframe}*M\_\text{slot}*M\_\text{mini-slot}+\text{subframe\_index\_Starting}*M\_\text{slot}*M\_\text{mini-slot}+\text{slot\_index\_Starting}*M\_\text{mini-slot}+\text{mini-slot\_index\_Starting} \quad (18),$$

where mini-slot_index_Starting represents an index of a mini-slot in which the first grant-free transmission resource is located, slot_index_Starting represents an index of a slot in which the mini-slot with the index mini-slot_index_Starting is located, subframe_index_Starting represents an index of a subframe in which the mini-slot with the index mini-slot_index_Starting is located, and SFN_Starting represents a system frame number of a radio frame in which the mini-slot with the index mini-slot_index_Starting is located.

By way of example but not limitation, when any grant-free transmission resource in the first time-domain period includes one or more time units, and the time unit is an OFDM symbol, TU_index may be further expressed as:

$$\text{TU\_index}=\text{SFN}*M\_\text{subframe}*M\_\text{slot}*M\_\text{symbol}+\text{subframe\_index}*M\_\text{slot}*M\_\text{symbol}+\text{slot\_index}*M\_\text{symbol}+\text{symbol\_index} \quad (19),$$

where

SFN represents a system frame number of a radio frame in which an OFDM symbol with the index symbol_index is located, subframe_index represents an index of a subframe in which the OFDM symbol with the index symbol_index is located, and slot_index represents an index of a slot in which the OFDM symbol with the index symbol_index is located.

Starting_index may be further expressed as:

$$\text{Starting\_index}=\text{SFN\_Starting}*M\_\text{subframe}*M\_\text{slot}*M\_\text{symbol}+\text{subframe\_index\_Starting}*M\_\text{slot}*M\_\text{symbol}+\text{slot\_index\_Starting}*M\_\text{symbol}+\text{symbol\_index\_Starting} \quad (20),$$

where symbol_index_Starting represents an index of an OFDM symbol in which the first grant-free transmission opportunity is located, slot_index_Starting represents an index of a slot in which the OFDM symbol with the index symbol_index_Starting is located, subframe_index_Starting represents an index of a subframe in which the OFDM symbol with the index symbol_index_Starting is located, and SFN_Starting represents a system frame number of a radio frame in which the OFDM symbol with the index symbol_index_Starting is located.

In another embodiment, a method for determining a local index corresponding to Starting_index and TU_index is described with regard to different types of time units. In this embodiment, it is assumed that each radio frame includes M_slot slots, each slot includes M_mini-slot mini-slots, and each slot includes M_symbol OFDM symbols. Indexes slot_index of the M_slot slots in one radio frame are 0, 1, . . . , and M_slot−1; indexes mini-slot_index of the M_mini-slot mini-slots in one slot are 0, 1, . . . , and M_mini-slot−1; and indexes symbol_index of the M_symbol symbols in one slot are 0, 1, . . . , and M_symbol−1.

M_slot, M_mini-slot, and M_symbol may be notified by the network device to the terminal device in any one of the following manners. M_slot, M_mini-slot, and M_symbol may be notified by the network device to the terminal device by sending any one type of higher layer signaling (e.g., RRC signaling), L1/L2 signaling (e.g., DCI), or a MAC CE. Alternatively, M_slot, M_mini-slot, and M_symbol may be pre-agreed on between the network device and the terminal device. Alternatively, M_slot, M_mini-slot, and M_symbol may be default values. This is not particularly limited in this embodiment of this application.

By way of example but not limitation, when any grant-free transmission resource in the first time-domain period includes one or more time units, and the time unit is a slot, TU_index may be determined based on an index of the slot, and for example, may be further expressed as:

$$TU\_index = SFN * M\_slot + slot\_index \quad (15a),$$

where

SFN represents a system frame number of a radio frame in which a slot with the index slot_index is located.

Starting_index is determined based on an index, in a radio frame, of a slot in which the first grant-free transmission resource is located, and for example, may be further expressed as:

$$Starting\_index = SFN\_Starting * M\_slot + slot\_index\_Starting \quad (16a),$$

where slot_index_Starting represents the index, in the radio frame, of the slot in which the first grant-free transmission resource is located, SFN_Starting represents a system frame number of the radio frame in which the slot with the index slot_index_Starting is located, and slot_index_Starting and SFN_Starting are determined based on the time-domain resource offset parameter.

By way of example but not limitation, when any grant-free transmission resource in the first time-domain period includes one or more time units, and the time unit is a mini-slot, TU_index may be determined based on an index of the mini-slot, and for example, may be further expressed as:

$$TU\_index = SFN * M\_slot * M\_mini\text{-}slot + slot\_index * M\_mini\text{-}slot + mini\text{-}slot\_index \quad (17a),$$

where

SFN represents a system frame number of a radio frame in which a mini-slot with the index mini-slot_index is located, and slot_index represents an index of a slot in which the mini-slot with the index mini-slot_index is located.

Starting_index may be determined based on an index, in a slot, of a mini-slot in which the first grant-free transmission resource is located, and for example, may be further expressed as:

$$Starting\_index = SFN\_Starting * M\_slot * M\_mini\text{-}slot + slot\_index\_Starting * M\_mini\text{-}slot + mini\text{-}slot\_index\_Starting \quad (18a),$$

where mini-slot_index_Starting represents the index, in the slot, of the mini-slot in which the first grant-free transmission resource is located, slot_index_Starting represents an index, in a radio frame, of the slot in which the mini-slot with the index mini-slot_index_Starting is located, SFN_Starting represents a system frame number of the radio frame in which the mini-slot with the index mini-slot_index_Starting is located, slot_index_Starting and SFN_Starting are determined based on the time-domain resource offset parameter, and mini-slot_index_Starting is determined based on the time-domain resource allocation parameter.

By way of example but not limitation, when any grant-free transmission resource in the first time-domain period includes one or more time units, and the time unit is an OFDM symbol, TU_index may be determined based on an index of the symbol, and for example, may be further expressed as:

$$TU\_index = SFN * M\_slot * M\_symbol + slot\_index * M\_symbol + symbol\_index \quad (19a),$$

where

SFN represents a system frame number of a radio frame in which an OFDM symbol with the index symbol_index is located, and slot_index represents an index of a slot in which the OFDM symbol with the index symbol_index is located.

Starting_index may be determined based on an index, in a slot, of an OFDM symbol in which the first grant-free transmission opportunity is located, and for example, may be further expressed as:

$$Starting\_index = SFN\_Starting * M\_slot * M\_symbol + slot\_index\_Starting * M\_symbol + symbol\_index\_Starting \quad (20a),$$

where symbol_index_Starting represents the index, in the slot, of the OFDM symbol in which the first grant-free transmission opportunity is located, slot_index_Starting represents an index, in a radio frame, of the slot in which the OFDM symbol with the index symbol_index_Starting is located, SFN_Starting represents a system frame number of the radio frame in which the OFDM symbol with the index symbol_index_Starting is located, slot_index_Starting and SFN_Starting are determined based on the time-domain resource offset parameter, and symbol_index_Starting is determined based on the time-domain resource allocation parameter.

Optionally, an index, in a radio frame or a subframe, of a slot in which the first grant-free transmission opportunity (or the first grant-free transmission resource) is located may be determined or obtained based on the time-domain resource offset parameter. In other words, the time-domain resource offset parameter is used to indicate the index, in the radio frame or the subframe, of the slot in which the first grant-free transmission opportunity is located. An index, in a slot, of a mini-slot in which the first grant-free transmission opportunity is located may be determined or obtained based on the time-domain resource allocation parameter. In other words, the time-domain resource allocation parameter is used to indicate the index, in the slot, of the mini-slot in which the first grant-free transmission opportunity is located. An index, in a slot, of an OFDM symbol in which the first grant-free transmission opportunity is located may be determined or obtained based on the time-domain resource allocation parameter. In other words, the time-domain resource allocation parameter is used to indicate the index, in the slot, of the OFDM symbol in which the first grant-free transmission opportunity is located.

In an embodiment, both the time-domain resource offset parameter and the time-domain resource allocation parameter may be notified by the network device to the terminal device in any one of the following manners. The time-domain resource offset parameter and the time-domain resource allocation parameter may be notified by the network device to the terminal device by sending any one type of higher layer signaling (e.g., RRC signaling), L1/L2 signaling (e.g., DCI, or a media access control control element (MAC CE)). Alternatively, the time-domain resource offset parameter and the time-domain resource allocation parameter may be pre-agreed on between the network device and the terminal device, for example, the time-domain resource offset parameter and the time-domain resource allocation parameter are specified in a standard. Alternatively, the time-domain resource offset parameter and the time-domain resource allocation parameter may be default values may be a default value. This is not particularly limited in this embodiment of this application.

In an embodiment, the time-domain resource offset parameter, the time-domain resource allocation parameter, and the grant-free transmission resource time-domain period may be notified by the network device to the terminal device by using one piece of signaling. For example, the three parameters are carried in RRC signaling. Alternatively, the three parameters may be notified by the network device to the terminal device by using different pieces of signaling. For example, the grant-free transmission resource time-domain period is notified to the terminal device by using RRC signaling, and the time-domain resource offset parameter and the time-domain resource allocation parameter are notified to the terminal device by using DCI. This is not particularly limited in this application.

A local index of a time unit in which any grant-free transmission resource is located can be determined according to any one of the relational expressions (7) to (14) and any one of the relational expressions (15), (17), (19), (15a), (17a), and (19a). Alternatively, it can be understood that, for a time unit determined based on a local index, whether the time unit is a time unit in which a grant-free transmission resource is located is determined in this manner.

The following uses an example in which any time unit included in any grant-free transmission resource in the first time-domain period is a mini-slot, to describe the method for determining, by the terminal device, the index of the time unit in which the grant-free transmission resource that is configured by the network device for the terminal device is located.

The terminal device determines, based on the index of the time unit in which the first grant-free transmission resource is located, the first time-domain period, the second time-domain period, and the quantity k of grant-free transmission resources in the first time-domain period, the index of the time unit in which the grant-free transmission resource is located.

Specifically, for example, based on the parameter information delivered by the network device, the terminal device determines that one slot includes M_mini-slot=7 mini-slots, and that any grant-free transmission resource occupies one mini-slot (that is, T=1); determines that each mini-slot occupies two OFDM symbols; determines that a radio frame in which the first grant-free transmission resource is located includes M_subframe=10 subframes, that a subframe in which the first grant-free transmission resource is located includes M_slot=2 slots, that the first time-domain period includes seven mini-slots, and that the second time-domain period includes two mini-slots; and further determines that a system frame number of the radio frame in which the first grant-free transmission resource is located is SFN_starting, that an index of the subframe in which the first grant-free transmission resource is located is 0, that is, subframe_index_starting=0, that an index of a slot in which the first grant-free transmission resource is located is 0, that is, slot_index_Starting=0, and that an index of a mini-slot in which the first grant-free transmission resource is located is 0, that is, mini-slot_index_Starting=0.

The quantity k of grant-free transmission resources included in the first time-domain period that is determined by the terminal device according to the relational expression (1) is as follows:

$$k=\mathrm{ceil}(7/2)=4.$$

The terminal device determines, according to the relational expression (18), that the global index Starting_index of the mini-slot in which the first grant-free transmission resource is located in the grant-free transmission resources is (140*SFN_starting+14*0+7*0+0).

It should be noted that, if the network device has not notified a value of the first time-domain period to the terminal device, the terminal device determines that the value of the first time-domain period is the quantity M_mini-slot of mini-slots included in one slot, that is, determines that the value of the first time-domain period is 7.

Figure 14:
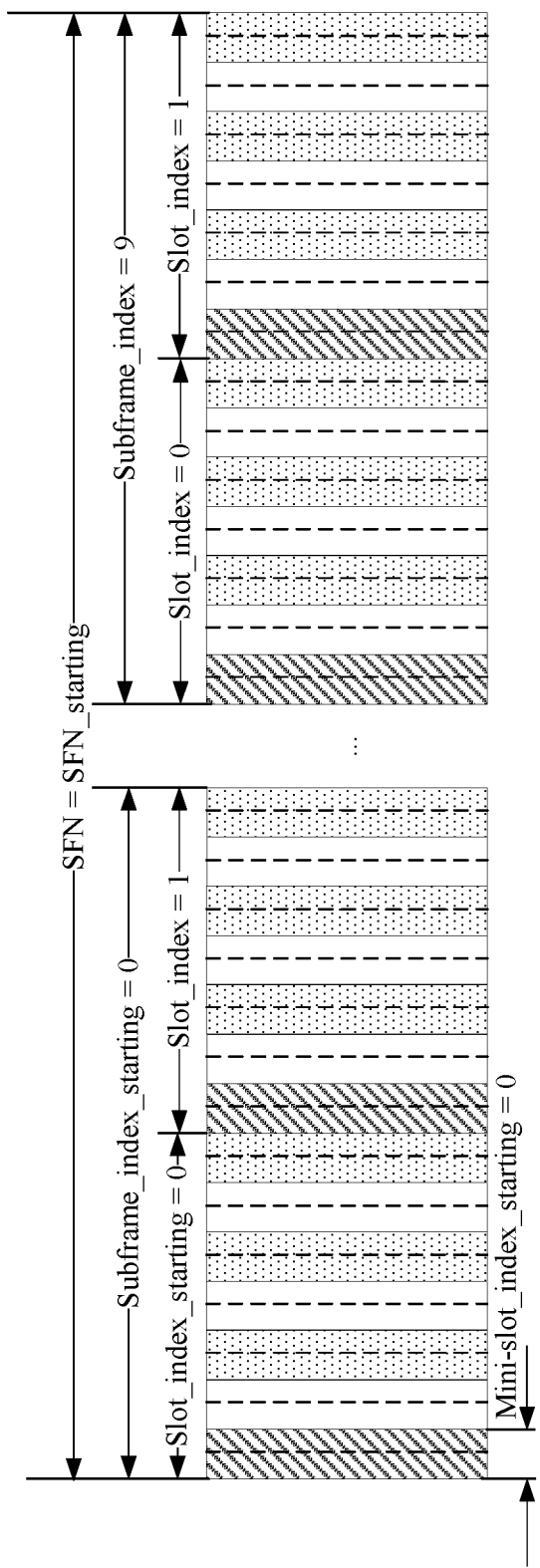
FIG. 14 is a schematic diagram of resource distribution of mini-slots included in a radio frame according to an embodiment of this application.

Thus far, the terminal device has determined the global index Starting_index of the mini-slot in which the first grant-free transmission resource is located in the grant-free transmission resources, and determined that one first time-domain period includes four mini-slots in which grant-free transmission resources are configured. The terminal device determines, according to any one of the relational expressions (7) to (10) or any one of the relational expressions (11) to (14), the relational expression (17), and the relational expression (18), an index, in the radio frame with the system frame number SFN_starting, of a mini-slot in which a grant-free transmission resource in the radio frame is located. A resource distribution status of grant-free transmission resources in the radio frame that are finally determined by the terminal device is shown in FIG. 14.

For another example, based on the parameter information delivered by the network device, the terminal device determines that one slot includes M_mini-slot=7 mini-slots; determines that each mini-slot occupies two OFDM symbols; determines that a radio frame in which the first grant-free transmission resource is located includes M_subframe=10 subframes, that a subframe in which the first grant-free transmission resource is located includes M_slot=2 slots, that the first time-domain period includes seven mini-slots, and that the second time-domain period includes two mini-slots; and further determines that a system frame number of the radio frame in which the first grant-free transmission resource is located is SFN_starting, that an index of the subframe in which the first grant-free transmission resource is located is 0, that is, subframe_index_starting=0, that an index of a slot in which the first grant-free transmission resource is located is 0, that is, slot_index_Starting=0, and that an index of a mini-slot in which the first grant-free transmission resource is located is 2, that is, mini-slot_index_Starting=2.

The quantity k of grant-free transmission resources included in the first time-domain period that is determined by the terminal device according to the relational expression (1) is as follows:

$$k=\mathrm{ceil}(7-2)/2=3.$$

The terminal device determines, according to the relational expression (18), that the global index Starting_index of the mini-slot in which the first grant-free transmission resource is located in the grant-free transmission resources is (140*SFN_starting+14*0+7*0+2).

It should be noted that, if the network device has not notified a value of the first time-domain period to the terminal device, the terminal device determines that the value of the first time-domain period is the quantity M_mini-slot of mini-slots included in one slot, that is, determines that the value of the first time-domain period is 7.

Figure 15:
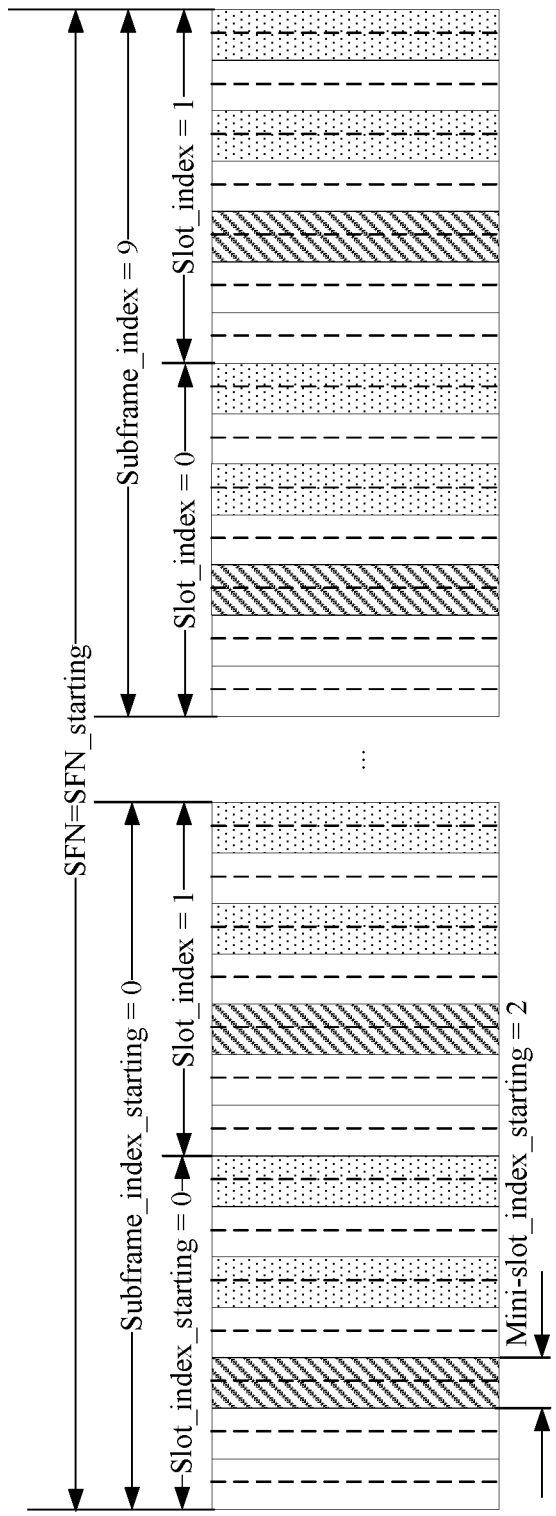
FIG. 15 is another schematic diagram of resource distribution of mini-slots included in a radio frame according to an embodiment of this application.

Thus far, the terminal device has determined the global index Starting_index of the mini-slot in which the first grant-free transmission resource is located in the grant-free transmission resources, and determined that one first time-domain period includes three mini-slots in which grant-free transmission resources are configured. The terminal device determines, according to any one of the relational expressions (7) to (10) or any one of the relational expressions (11) to (14), the relational expression (17), and the relational expression (18), an index, in the radio frame with the system frame number SFN_starting, of a mini-slot in which a grant-free transmission resource in the radio frame is located. A resource distribution status of grant-free transmission resources in the radio frame that are finally determined by the terminal device is shown in FIG. 15.

The following uses an example in which any time unit included in any grant-free transmission resource in the first time-domain period is an OFDM symbol, to describe the method for determining, by the terminal device, the index of the time unit in which the grant-free transmission resource that is configured by the network device for the terminal device is located.

The terminal device determines, based on the index of the time unit in which the first grant-free transmission resource is located, the first time-domain period, the second time-domain period, and the quantity k of grant-free transmission resources in the first time-domain period, the index of the time unit in which the grant-free transmission resource is located.

Specifically, for example, based on the parameter information delivered by the network device, the terminal device determines that one slot includes M_symbol=14 OFDM symbols, and that any grant-free transmission resource occupies two OFDM symbols (that is, T=2); determines that a radio frame in which the first grant-free transmission resource is located includes M_subframe=10 subframes, that a subframe in which the first grant-free transmission resource is located includes M_slot=2 slots, that the first time-domain period includes 14 OFDM symbols, and that the second time-domain period includes four OFDM symbols; and further determines that a system frame number of the radio frame in which the first grant-free transmission resource is located is SFN_starting, that an index of the subframe in which the first grant-free transmission resource is located is 0, that is, subframe_index_Starting=0, that an index of a slot in which the first grant-free transmission resource is located is 0, that is, slot_index_Starting=0, and that an index of an OFDM symbol in which the first grant-free transmission resource is located is 0, that is, symbol_index_Starting=0.

The quantity k of grant-free transmission resources included in the first time-domain period that is determined by the terminal device according to the relational expression (1) is as follows:

$$k=\text{ceil}(14/4)=4.$$

The terminal device determines, according to the relational expression (20), that the global index Starting_index of the OFDM symbol in which the first grant-free transmission resource is located in the grant-free transmission resources is (280*SFN_starting+28*0+14*0+0).

It should be noted that, if the network device has not notified a value of the first time-domain period to the terminal device, the terminal device determines that the value of the first time-domain period is the quantity M_symbol of OFDM symbols included in one slot, that is, determines that the value of the first time-domain period is 14.

Figure 16:
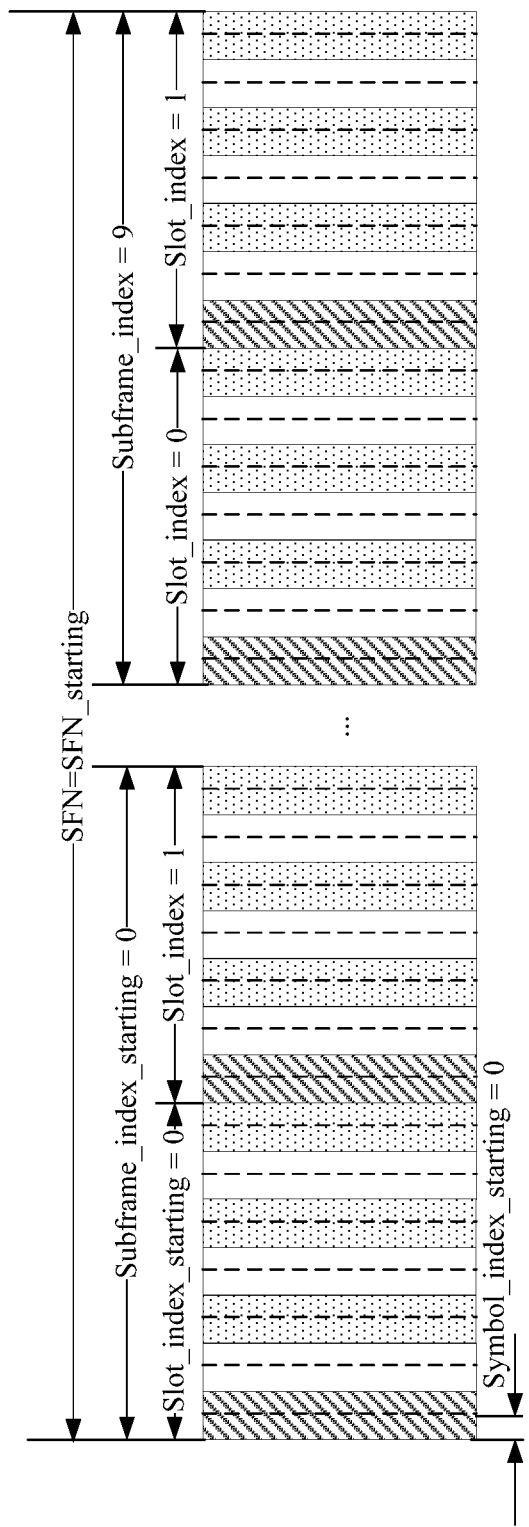
FIG. 16 is a schematic diagram of resource distribution of OFDM symbols included in a radio frame according to an embodiment of this application.

Thus far, the terminal device has determined the global index Starting_index of the OFDM symbol in which the first grant-free transmission resource is located in the grant-free transmission resources, and determined that one first time-domain period includes four grant-free transmission resources, and each grant-free transmission resource includes two OFDM symbols. The terminal device determines, according to any one of the relational expressions (7) to (10) or any one of the relational expressions (11) to (14), the relational expression (19), and the relational expression (20), an index, in the radio frame with the system frame number SFN_starting, of an OFDM symbol in which a grant-free transmission resource in the radio frame is located. A resource distribution status of grant-free transmission resources in the radio frame that are finally determined by the terminal device is shown in FIG. 16.

For another example, based on the parameter information delivered by the network device, the terminal device determines that one slot includes M_symbol=14 OFDM symbols, and that any grant-free transmission resource occupies two OFDM symbols (that is, T=2); determines that a radio frame in which the first grant-free transmission resource is located includes M_subframe=10 subframes, that a subframe in which the first grant-free transmission resource is located includes M_slot=2 slots, that the first time-domain period includes 14 OFDM symbols, and that the second time-domain period includes four OFDM symbols; and further determines that a system frame number of the radio frame in which the first grant-free transmission resource is located is SFN_starting, that an index of the subframe in which the first grant-free transmission resource is located is 0, that is, subframe_index_starting=0, that an index of a slot in which the first grant-free transmission resource is located is 0, that is, slot_index_Starting=0, and that an index of an OFDM symbol in which the first grant-free transmission resource is located is 2, that is, symbol_index_starting=2.

The quantity k of grant-free transmission resources included in the first time-domain period that is determined by the terminal device according to the relational expression (1) is as follows:

$$k=\text{ceil}(14-2)/4=3.$$

The terminal device determines, according to the relational expression (20), that the global index Starting_index of the OFDM symbol in which the first grant-free transmission resource is located in the grant-free transmission resources is (280*SFN_starting+28*0+14*0+2).

It should be noted that, if the network device has not notified a value of the first time-domain period to the terminal device, the terminal device determines that the value of the first time-domain period is the quantity M_symbol of OFDM symbols included in one slot, that is, determines that the value of the first time-domain period is 14.

Figure 17:
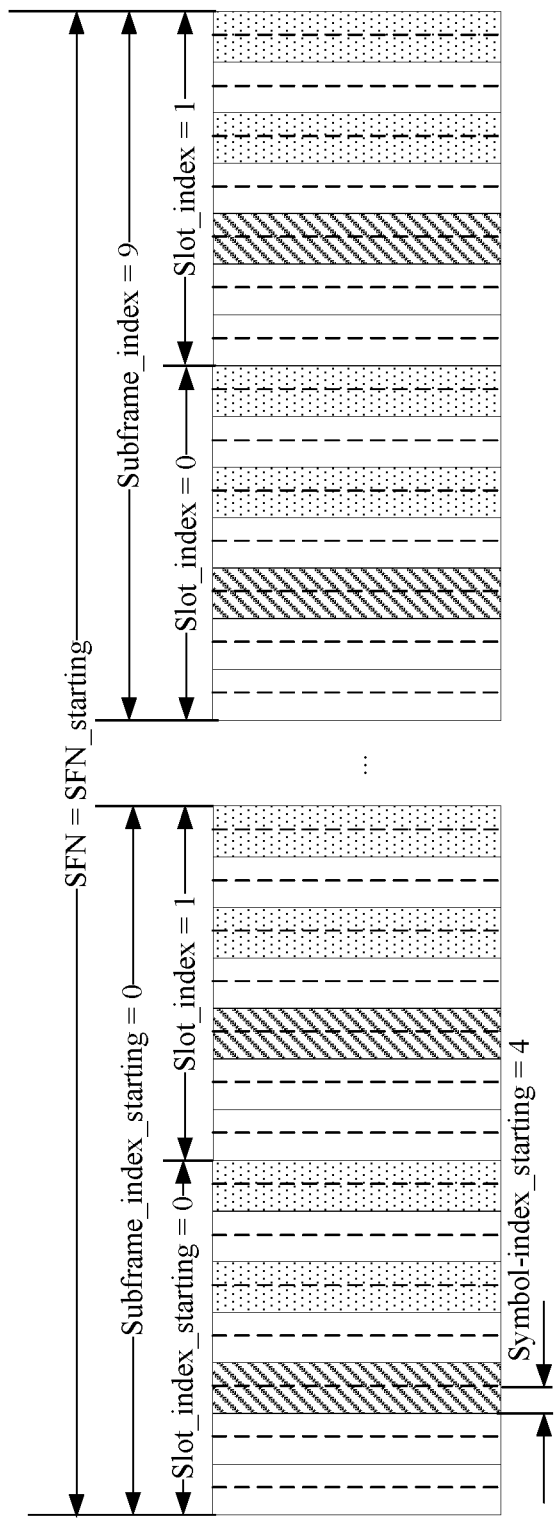
FIG. 17 is another schematic diagram of resource distribution of OFDM symbols included in a radio frame according to an embodiment of this application.

Thus far, the terminal device has determined the global index Starting_index of the OFDM symbol in which the first grant-free transmission resource is located in the grant-free transmission resources, and determined that one first time-domain period includes three grant-free transmission resources, and each grant-free transmission resource includes two OFDM symbols. The terminal device determines, according to any one of the relational expressions (7) to (10) or any one of the relational expressions (11) to (14), the relational expression (19), and the relational expression (20), an index, in the radio frame with the system frame number SFN_starting, of an OFDM symbol in which a grant-free transmission resource in the radio frame is located. A resource distribution status of grant-free transmission resources in the radio frame that are finally determined by the terminal device is shown in FIG. 17. Optionally, the method 200 may further include the following steps.

204. The terminal device sends uplink data to the network device on the determined grant-free transmission resource.

Specifically, in step 203, the terminal device determines the index of the time unit in which the grant-free transmission resource in the first time-domain period is located, and in step 204, the terminal device can send the uplink data to the network device on the determined grant-free transmission resource.

When the uplink data is sent to the network device, an initial transmission of N repetitions of a data packet may be sent to the network device on the first-type grant-free transmission resource, and a non-initial repetition of the N repetitions of the data packet may be sent on the second-type grant-free transmission resource.

When the first-type grant-free transmission resource is used for the initial repetition of the N repetitions of sending the data packet, and the second-type grant-free transmission resource is used for the non-initial repetition of the N repetitions of sending the data packet, the terminal device sends, in the following several implementations, the data packet by using the grant-free transmission resource that is allocated by the network device to the terminal device.

Manner 1

Figure 18:
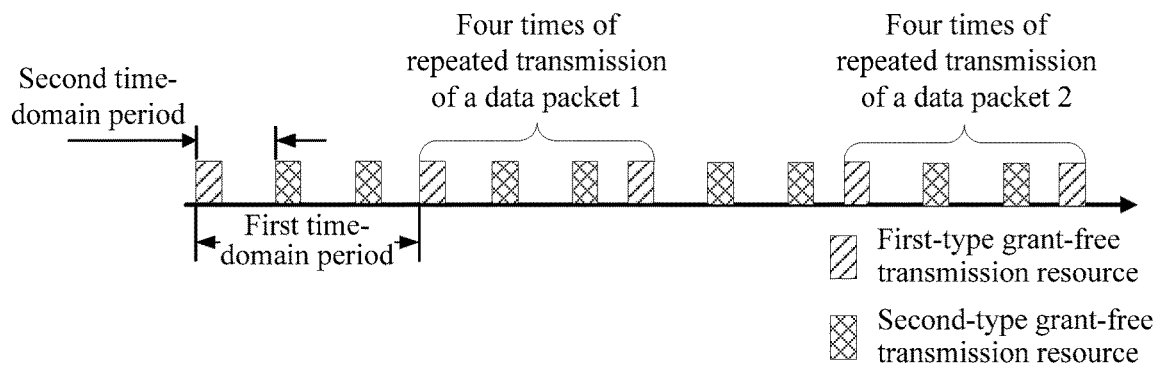
FIG. 18 is a schematic diagram of resource distribution of grant-free transmission resources carrying data packets according to an embodiment of this application.

When the quantity k of grant-free transmission resources in the first time-domain period is less than the maximum quantity N of repetitions, for example, k=3, and N=4, when the terminal device sends uplink data to the network device, the terminal device may implement four times of repeated transmission of a data packet 1 by occupying three grant-free transmission resources in the current first time-domain period and the first grant-free transmission resource in a following first time-domain period. Correspondingly, the terminal device implements four times of repeated transmission of a data packet 2 in the same manner. A schematic flowchart of data packet sending is shown in FIG. 18.

Manner 2

Figure 19:
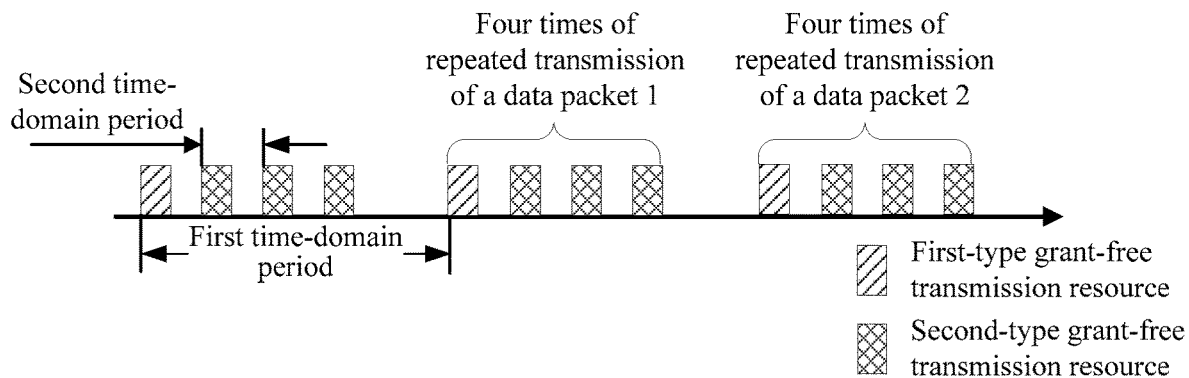
FIG. 19 is another schematic diagram of resource distribution of grant-free transmission resources carrying data packets according to an embodiment of this application.

When the quantity k of grant-free transmission resources in the first time-domain period is equal to the maximum quantity N of repetitions, for example, k=4, and N=4, when the terminal device sends uplink data to the network device, the terminal device may implement four times of repeated transmission of a data packet 1 by occupying four grant-free transmission resources in the current first time-domain period. Correspondingly, the terminal device implements four times of repeated transmission of a data packet 2 in the same manner. A schematic flowchart of data packet sending is shown in FIG. 19.

Manner 3

Figure 20:
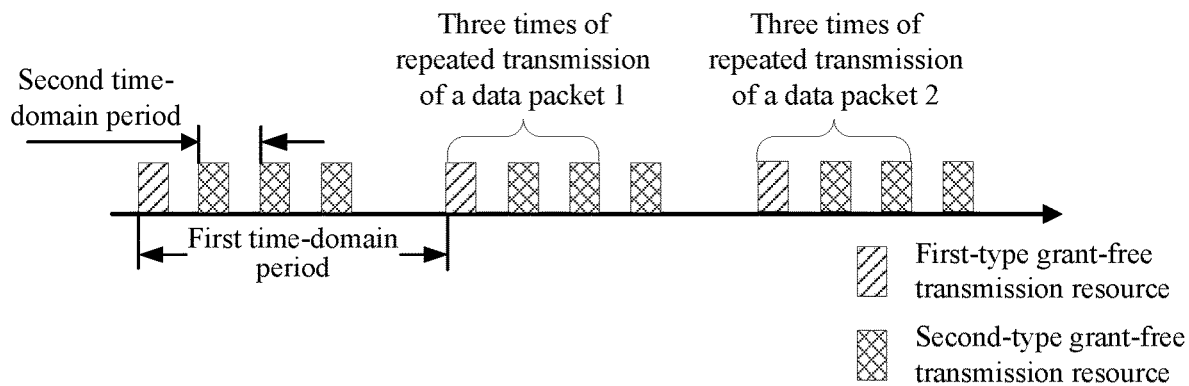
FIG. 20 is still another schematic diagram of resource distribution of grant-free transmission resources carrying data packets according to an embodiment of this application.

When the quantity k of grant-free transmission resources in the first time-domain period is greater than the maximum quantity N of repetitions, for example, k=4, and N=3, when the terminal device sends uplink data to the network device, the terminal device may implement three times of repeated transmission of a data packet 1 by occupying the first three grant-free transmission resources in the current first time-domain period. Correspondingly, the terminal device implements three times of repeated transmission of a data packet 2 in the same manner. A schematic flowchart of data packet sending is shown in FIG. 20.

Optionally, the network device may determine, by using at least the following method, whether the terminal device uses the first-type grant-free transmission resource to initially send a data packet.

Specifically, the network device determines, based on a transmission latency requirement of the data packet, whether the terminal device uses the first-type grant-free transmission resource to initially send the data packet. For example, when the transmission latency requirement of the data packet is higher than a preset transmission latency threshold, the network device determines that the terminal device uses the first-type grant-free transmission resource to initially send the data packet.

Optionally, after the network device determines that the terminal device uses the first-type grant-free transmission resource to initially send the data packet, the network device may instruct, by using but not limited to any one of the following methods, the terminal device to use the first-type grant-free transmission resource to initially send the data packet.

Method 1

The network device explicitly sends indication information to the terminal device, and the indication information is used to instruct the terminal device to use the first-type grant-free transmission resource to initially send the data packet.

By way of example but not limitation, the network device may send the indication information to the terminal device by using higher layer signaling (e.g., RRC signaling), L1/L2 signaling (e.g., DCI), or a MAC CE.

Method 2

The network device implicitly instructs the terminal device to use the first-type grant-free transmission resource to initially send the data packet.

Specifically, the terminal device may determine, based on the first time-domain period configured by the network device, whether to use the first-type grant-free transmission resource to initially send the data packet. For example, when the first time-domain period is less than a preset period threshold, the terminal device determines to use the first-type grant-free transmission resource to initially send the data packet.

Alternatively, the terminal device may determine, based on a value relationship between the quantity k of grant-free transmission resources in the first time-domain period and the maximum quantity N of times of repeated transmission configured by the network device, whether to use the first-type grant-free transmission resource to initially send the data packet. For example, when the quantity k of grant-free transmission resources in the first time-domain period is greater than or equal to the maximum quantity N of times of repeated transmission, the terminal device determines to use the first-type grant-free transmission resource to initially send the data packet.

205. The network device obtains the quantity k of grant-free transmission resources in the first time-domain period of the grant-free transmission resource.

206. The network device determines, based on the first time-domain period, the second time-domain period, and the quantity k of grant-free transmission resources in the first time-domain period, an index of a time unit in which a grant-free transmission resource used for receiving grant-free data is located, where a size of the first time-domain period is $P_1$ time units, a size of the second time-domain period is $P_2$ time units, and $P_1$ is greater than or equal to $P_2$.

207. The network device receives, on the determined grant-free transmission resource, the uplink data sent by the terminal device.

Specifically, when the network device receives the uplink data that is sent by the terminal device on the grant-free transmission resource, the network device also needs to first determine the index of the time unit in which the grant-free transmission resource is located, and receives, on the grant-free transmission resource indicated by the determined index of the time unit, the uplink data that is sent by the terminal device.

For a method for determining, by the network device, the index of the time unit in which the grant-free transmission resource is located, refer to related descriptions on the terminal device side. For brevity, details are not described herein again.

This application also provides a method for determining an index of a time unit in which a grant-free transmission resource Y is located, with regard to grant-free transmission resources configured based on a single period. The following briefly describes the method.

Optionally, a terminal device determines, based on an index of a time unit in which the first grant-free transmission resource is located and a time-domain period P, an index of a time unit in which the grant-free transmission resource is located.

Specifically, the terminal device determines the index of the time unit in which the grant-free transmission resource Y is located, according to any one of the following relational expressions:

$$TU\_index=Starting\_index+Y*P \quad (21);$$

$$TU\_index=[Starting\_index+Y*P] \bmod X \quad (22);$$

$$TU\_index=Starting\_index+Y*P+F_2 \quad (23);$$

$$TU\_index=[Starting\_index+Y*P+F_2] \bmod X \quad (24);$$

$$[TU\_index-Starting\_index] \bmod P=Y \quad (25);$$

and $$[TU\_index-Starting\_index-F_2] \bmod P=Y \quad (26),$$

where $F_2$ represents a correction parameter, and a value of $F_2$ is related to a value of Y;

Y is a nonnegative integer, and is used to indicate a sequence number of a grant-free transmission resource;

X is a preset nonnegative integer;

Starting_index represents the index of the time unit in which the first grant-free transmission resource is located; and TU_index represents an index of a time unit in which any grant-free transmission resource including the first grant-free transmission resource is located.

By way of example but not limitation, when any grant-free transmission resource in the time-domain period includes one time unit, and the time unit is a slot, TU_index is expressed as, for example, the relational expression (15), and Starting_index is expressed as, for example, the relational expression (16).

By way of example but not limitation, when any grant-free transmission resource in the time-domain period includes one time unit, and the time unit is a mini-slot, TU_index is expressed as, for example, the relational expression (17), and Starting_index is expressed as, for example, the relational expression (18).

By way of example but not limitation, when any grant-free transmission resource in the time-domain period includes one or more time units, and the time unit is an OFDM symbol, TU_index is expressed as, for example, the relational expression (19), and Starting_index is expressed as, for example, the relational expression (20).

By way of example but not limitation, when any grant-free transmission resource in the time-domain period includes one or more time units, and the time unit is a slot, TU_index is expressed as, for example, the relational expression (15a), and Starting_index may be determined based on a time-domain resource offset parameter, and is expressed as, for example, the relational expression (16a).

By way of example but not limitation, when any grant-free transmission resource in the time-domain period includes one or more time units, and the time unit is a mini-slot, TU_index is expressed as, for example, the relational expression (17a), and Starting_index may be determined based on a time-domain resource offset parameter and a time-domain resource allocation parameter, and is expressed as, for example, the relational expression (18a). An index, in a radio frame, of a slot in which the first grant-free transmission opportunity is located is determined based on the time-domain resource offset parameter. An index, in the slot, of a mini-slot in which the first grant-free transmission opportunity is located is determined based on the time-domain resource allocation parameter.

By way of example but not limitation, when any grant-free transmission resource in the time-domain period includes one or more time units, and the time unit is an OFDM symbol, TU_index is expressed as, for example, the relational expression (19a), and Starting_index may be determined based on a time-domain resource offset parameter and a time-domain resource allocation parameter, and is expressed as, for example, the relational expression (20a). An index, in a radio frame, of a slot in which the first grant-free transmission opportunity is located is determined based on the time-domain resource offset parameter. An index, in the slot, of an OFDM symbol in which the first grant-free transmission opportunity is located is determined based on the time-domain resource allocation parameter.

For a specific implementation method for determining, by the terminal device, an index of a time unit in which a grant-free transmission resource that is configured by a network device for the terminal device is located, refer to the foregoing related descriptions. For brevity, details are not described herein again.

It should be noted that, in this embodiment of this application, for the time unit, determined by the terminal device, in which the grant-free transmission resource Y is located, when the time unit in which the grant-free transmission resource is located is an unavailable time unit (e.g., the time unit is a time unit used for downlink transmission, or the time unit is another time unit used for non-grant-free uplink transmission), the terminal device may ignore or discard the grant-free transmission resource located in the time unit (or starting from the time unit). Alternatively, the terminal device may re-determine, in the following method, the time unit in which the grant-free transmission resource is located.

Figure 21:
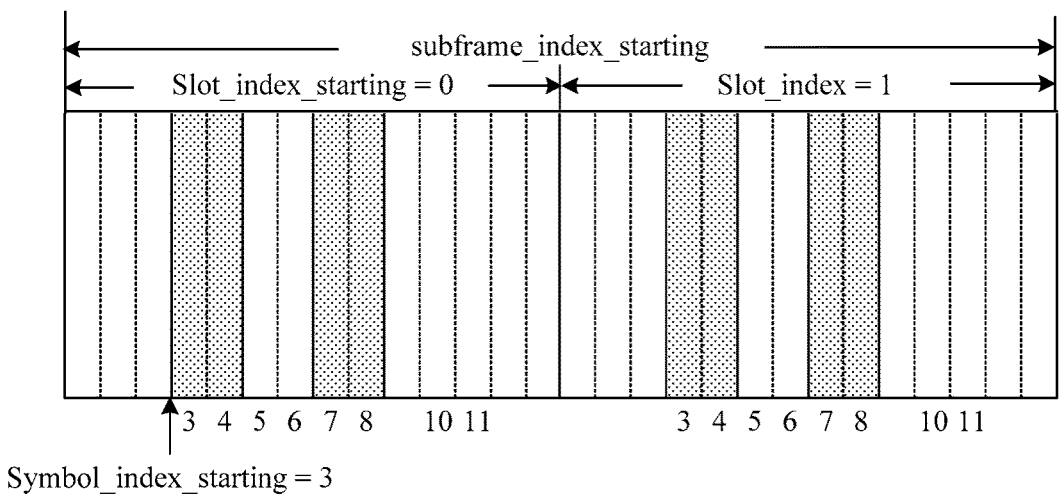
FIG. 21 is still another schematic diagram of resource distribution of OFDM symbols included in a radio frame according to an embodiment of this application.

Specifically, a distribution status of uplink symbols that can be used for grant-free transmission in a slot (an example of a time unit) in which the grant-free transmission resource Y is located is shown in FIG. 21. For example, in a slot, a symbol 3 to a symbol 8 can be used for grant-free transmission of uplink data, and other symbols cannot be used for grant-free transmission of uplink data.

An index Starting_index of an OFDM symbol in which the first grant-free transmission resource is located is 3, and therefore the initial (that is, Y=0) grant-free transmission opportunity occurs on a symbol 3 and a symbol 4 (e.g., one grant-free transmission resource occupies two symbols). It is assumed that the time-domain period P is seven symbols, and it is determined, according to any one of the relational expressions (7) to (10) or any one of the relational expressions (11) to (14), the relational expression (19), and the relational expression (20), that a grant-free transmission opportunity 1 (that is, Y=1) occurs on a symbol 10 and a symbol 11. However, the symbol 10 and the symbol 11 cannot be used for grant-free transmission of uplink data. In this case, the value of $F_2$ in the relational expression (9) or (10) is −3. Therefore, when $F_2$=−3, it is determined, according to the relational expression (9) or (10), that the grant-free transmission opportunity 1 occurs on a symbol 7 and a symbol 8.

It should be noted that the value of $F_2$ is related to any one of the following parameters: the value of Y, and/or a frame structure, and/or the index of the time unit in which the first grant-free transmission resource is located, and/or a quantity of time units included in one grant-free transmission resource.

It should also be noted that the value of $F_2$ may be configured by the network device for the terminal device, or may be specified in a standard. This is not particularly limited in this embodiment of this application.

Optionally, for the time unit, determined by the terminal device, in which the grant-free transmission resource Y is located, when the time unit in which the grant-free transmission resource is located is an unavailable time unit (e.g., the time unit is a time unit used for downlink transmission, or the time unit is another time unit used for non-grant-free uplink transmission), if the terminal device ignores or discards the grant-free transmission resource, and the terminal device should have sent the $n^{th}$ ($1 < n \leq N$) repetition of a data packet on the grant-free transmission resource, the terminal device may choose to abandon the $n^{th}$ repetition of the data packet, and use a following grant-free transmission resource to send a maximum of the remaining (N−n) repetitions of the data packet, or the terminal device may use a following grant-free transmission resource to send (N−n+1) repetitions of the data packet. Whether the terminal device abandons the $n^{th}$ repetition may be configured by the base station. For example, the base station notifies, by delivering an instruction, the terminal device whether to abandon, if the grant-free transmission resource Y is available, the $n^{th}$ repetition. Alternatively, the terminal device may independently determine whether to abandon the $n^{th}$ repetition. For example, when a service has a high requirement on a latency, the terminal device abandons the $n^{th}$ repetition, and uses a following grant-free transmission resource to send a maximum of the remaining (N−n) repetitions, or if the terminal device does not abandon the $n^{th}$ repetition, the terminal device uses a following grant-free transmission resource to send (N−n+1) repetitions of the data packet. For another example, when a service requires high reliability, the terminal device uses a following grant-free transmission resource to send the remaining (N−n+1) repetitions; otherwise, the terminal device abandons the $n^{th}$ repetition, and uses a following grant-free transmission resource to send a maximum of the remaining (N−n) repetitions.

The foregoing describes, with reference to FIG. 2 to FIG. 21, the methods for determining a time-domain resource used for grant-free transmission provided in the embodiments of this application. The following describes, with reference to FIG. 22 and FIG. 23, a communications apparatus and a communications device provided in embodiments of this application.

Figure 22:
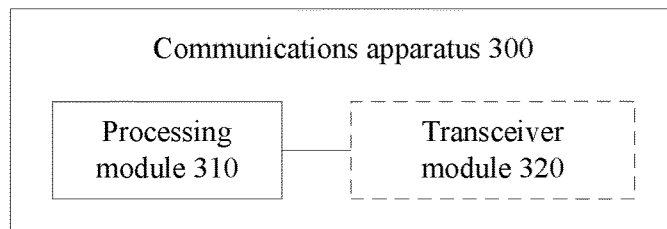
FIG. 22 is a schematic block diagram of a communications apparatus according to an embodiment of this application.

FIG. 22 is a schematic block diagram of a communications apparatus 300 according to an embodiment of this application. The communications apparatus 300 includes a processing module 310 and a transceiver module 320.

In an optional implementation, the communications apparatus 300 is a terminal device.

The processing module 310 is configured to obtain a first time-domain period and a second time-domain period of grant-free transmission resources. A size of the first time-domain period is $P_1$ time units, a size of the second time-domain period is $P_2$ time units, and $P_1$ is greater than or equal to $P_2$.

The processing module 310 is further configured to obtain a quantity k of grant-free transmission resources in the first time-domain period.

The processing module 310 is further configured to determine, based on the first time-domain period, the second time-domain period, and the quantity k of grant-free transmission resources in the first time-domain period, an index of a time unit in which a grant-free transmission resource used for grant-free transmission is located.

Optionally, the processing module 310 is further configured to determine, based on an index of a time unit in which the first grant-free transmission resource is located, the first time-domain period, the second time-domain period, and the quantity k of grant-free transmission resources in the first time-domain period, the index of the time unit in which the grant-free transmission resource is located.

Optionally, the processing module 310 is further configured to determine, according to any one of the foregoing relational expressions (7) to (10), an index of a grant-free transmission resource Y In another embodiment, the processing module 310 is further configured to determine, according to any one of the foregoing relational expressions (11) to (14), an index of a grant-free transmission resource (D*k+e).

Optionally, the processing module 310 is further configured to determine, according to any one of the foregoing relational expressions (21) to (24), an index of a time unit in which a grant-free transmission resource Y is located.

Optionally, the quantity k of grant-free transmission resources in the first time-domain period is determined based on the first time-domain period and the second time-domain period.

Optionally, the processing module 310 is further configured to determine, according to any one of the foregoing relational expressions (1) to (6), the quantity k of grant-free transmission resources in the first time-domain period.

Optionally, the processing module 310 is further configured to obtain format information of the mini-slot when the time unit is specifically a mini-slot. The format information of the mini-slot includes at least a quantity of orthogonal frequency division multiplexing OFDM symbols included in each mini-slot and a location of a starting OFDM symbol of each mini-slot in each slot, or includes a location of a starting OFDM symbol of each mini-slot in each slot and a location of an end OFDM symbol of each mini-slot in each slot. The quantity k of grant-free transmission resources in the first time-domain period is determined based on the first time-domain period, the second time-domain period, and the format information of the mini-slot.

Optionally, the time unit includes at least any one of the following time units: a radio frame, a subframe, a slot, or an OFDM symbol.

Optionally, the transceiver module 320 is configured to send uplink data on the determined grant-free transmission resource.

In another optional implementation, the communications apparatus 300 is a network device.

The processing module 310 is configured to obtain a quantity k of grant-free transmission resources in a first time-domain period of a grant-free transmission resource.

The processing module 310 is further configured to determine, based on the first time-domain period, a second time-domain period of a grant-free transmission resource, and the quantity k of grant-free transmission resources in the first time-domain period, an index of a time unit in which a grant-free transmission resource used for receiving grant-free data is located. A size of the first time-domain period is $P_1$ time units, a size of the second time-domain period is $P_2$ time units, and $P_1$ is greater than or equal to $P_2$.

Optionally, the processing module 310 is further configured to determine, based on an index of a time unit in which the first grant-free transmission resource is located, the first time-domain period, the second time-domain period, and the quantity k of grant-free transmission resources in the first time-domain period, an index of a time unit in which a grant-free transmission resource used for receiving grant-free data is located.

Optionally, the processing module 310 is further configured to determine, according to any one of the foregoing relational expressions (7) to (10), an index of a time unit in which a grant-free transmission resource Y is located. In another embodiment, the processing module 310 is further configured to determine, according to any one of the foregoing relational expressions (11) to (14), an index of a grant-free transmission resource (D*k+e).

Optionally, the processing module 310 is further configured to determine, according to any one of the foregoing relational expressions (21) to (24), an index of a time unit in which a grant-free transmission resource Y is located.

Optionally, the quantity k of grant-free transmission resources in the first time-domain period is determined based on the first time-domain period and the second time-domain period.

Optionally, the processing module 310 is further configured to determine, according to any one of the foregoing relational expressions (1) to (6), a quantity k of grant-free transmission resources in the first time-domain period.

Optionally, the processing module 310 is further configured to determine format information of the mini-slot when the time unit is specifically a mini-slot. The format information of the mini-slot includes at least a quantity of orthogonal frequency division multiplexing OFDM symbols included in each mini-slot and a location of a starting OFDM symbol of each mini-slot in each slot, or includes a location of a starting OFDM symbol of each mini-slot in each slot and a location of an end OFDM symbol of each mini-slot in each slot. The quantity k of grant-free transmission resources in the first time-domain period is determined based on the first time-domain period, the second time-domain period, and the format information of the mini-slot.

Optionally, the time unit includes at least any one of the following time units: a radio frame, a subframe, a slot, or an OFDM symbol.

Optionally, the transceiver module 320 is configured to receive, on the determined grant-free transmission resource, uplink data sent by the terminal device.

It should be understood that, the processing module 310 in this embodiment of the present invention may be implemented by a processor or a circuit component related to a processor, and the transceiver module 320 may be implemented by a transceiver or a circuit component related to a transceiver.

Figure 23:
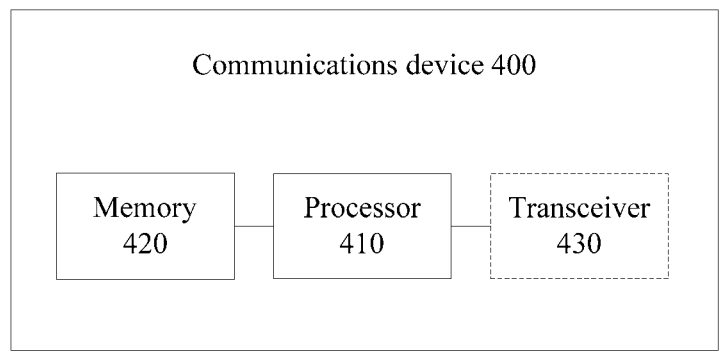
FIG. 23 is a schematic block diagram of a communications device according to an embodiment of this application.

As shown in FIG. 23, an embodiment of this application further provides a communications device 400. The communications device 400 includes a processor 410, a memory 420, and a transceiver 430. The processor 410 may be implemented by software such as an instruction or a program, by hardware, or by a combination of software and hardware.

In an optional implementation, the communications device 400 is a terminal device, the memory 420 stores an instruction or a program, and the processor 430 is configured to execute the instruction or the program stored in the memory 420. When the instruction or the program stored in the memory 420 is executed, the processor 410 is configured to perform an operation performed by the processing module 310 of the terminal device in the foregoing embodiment, and the transceiver 430 is configured to perform an operation performed by the transceiver module 320 of the terminal device in the foregoing embodiment.

In another optional implementation, the communications device 400 is a network device, the memory 420 stores an instruction or a program, and the processor 430 is configured to execute the instruction or the program stored in the memory 420. When the instruction or the program stored in the memory 420 is executed, the processor 410 is configured to perform an operation performed by the processing module 310 of the network device in the foregoing embodiment, and the transceiver 430 is configured to perform an operation performed by the transceiver module 320 of the network device in the foregoing embodiment.

In another optional implementation, all or some of functions of the communications apparatus 300 or the communications device 400 may be implemented by using a system on chip (SoC) technology, for example, by using a chip. The chip is integrated with a kernel, an input/output interface, and the like. The input/output interface can implement a function of the transceiver module, for example, performing operations of sending uplink data to a network device on a determined grant-free transmission resource, and receiving, on the determined grant-free transmission resource, the uplink data sent by a terminal device. The kernel can implement a processing function, for example, performing an operation of obtaining a first time-domain period and a second time-domain period of grant-free transmission resources, where a size of the first time-domain period is $P_1$ time units, a size of the second time-domain period is $P_2$ time units, and $P_1$ is greater than or equal to $P_2$, or performing an operation of obtaining a quantity k of grant-free transmission resources in the first time-domain period, or performing an operation of determining, based on the first time-domain period, the second time-domain period, and the quantity k of grant-free transmission resources in the first time-domain period, an index of a time unit in which a grant-free transmission resource used for grant-free transmission is located. The functions of the kernel and the input/output interface may be implemented by hardware, or may be implemented by corresponding software executed by hardware. The hardware or the software includes one or more modules corresponding to the function. It should be understood that, the processor mentioned in the embodiments of the present invention may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

It may be further understood that the memory mentioned in the embodiments of the present invention may be a volatile memory or a nonvolatile memory, or may include both a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By way of example but not limitation, many forms of RAMs may be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that, when the processor is a general purpose processor, a DSP, an ASIC, an FPGA or another programmable logic device, a discrete gate or transistor logic device, or a discrete hardware component, the memory (a storage module) is integrated into the processor.

It should be noted that the memory described in this specification is intended to include but is not limited to these types of memories and any other appropriate types of memories.

The present invention further provides the following embodiments. It should be noted that sequence numbers of the following embodiments do not need to be consistent with sequence numbers of the foregoing embodiments.

Embodiment 1

A method for determining a time-domain resource used for grant-free transmission is provided, including:

obtaining, by a terminal device, a first time-domain period and a second time-domain period of grant-free transmission resources, where a size of the first time-domain period is $P_1$ time units, a size of the second time-domain period is $P_2$ time units, and $P_1$ is greater than or equal to $P_2$;

obtaining, by the terminal device, a quantity k of grant-free transmission resources in the first time-domain period; and determining, by the terminal device based on the first time-domain period, the second time-domain period, and the quantity k of grant-free transmission resources in the first time-domain period, an index of a time unit in which a grant-free transmission resource used for grant-free transmission is located.

Embodiment 2

According to the method described in Embodiment 1, the determining, by the terminal device based on the first time-domain period, the second time-domain period, and the quantity k of grant-free transmission resources in the first time-domain period, an index of a time unit in which a grant-free transmission resource used for grant-free transmission is located includes:

determining, by the terminal device based on an index of a time unit in which the first grant-free transmission resource is located, the first time-domain period, the second time-domain period, and the quantity k of grant-free transmission resources in the first time-domain period, the index of the time unit in which the grant-free transmission resource used for grant-free transmission is located.

Embodiment 3

According to the method described in Embodiment 2, the determining, by the terminal device based on an index of a time unit in which the first grant-free transmission resource is located, the first time-domain period, the second time-domain period, and the quantity k of grant-free transmission resources in the first time-domain period, the index of the time unit in which the grant-free transmission resource used for grant-free transmission is located includes:

determining, by the terminal device, an index of a time unit in which a grant-free transmission resource Y is located, according to any one of the following relational expressions:

$$TU\_index = Starting\_index + floor(Y/k)*P_1 + (Y \bmod k)*P_2;$$

$$TU\_index = [Starting\_index + floor(Y/k)*P_1 + (Y \bmod k)*P_2] \bmod X;$$

$$TU\_index = Starting\_index + floor(Y/k)*P_1 + (Y \bmod k)*P_2 + F_2; \text{ or}$$

$$TU\_index = [Starting\_index + floor(Y/k)*P_1 + (Y \bmod k)*P_2 + F_2] \bmod X,$$

where $F_2$ represents a correction parameter, and a value of $F_2$ is related to a value of Y;

Y is a nonnegative integer, and is used to indicate a sequence number of a grant-free transmission resource;

X is a preset nonnegative integer;

Starting_index represents the index of the time unit in which the first grant-free transmission resource is located; and TU_index represents an index of a time unit in which any grant-free transmission resource including the first grant-free transmission resource is located.

Embodiment 4

According to the method described in any one of Embodiment 1 to Embodiment 3, the quantity k of grant-free transmission resources in the first time-domain period is determined based on the first time-domain period and the second time-domain period.

Embodiment 5

According to the method described in Embodiment 4, the determining a quantity k of grant-free transmission resources in the first time-domain period based on the first time-domain period and the second time-domain period includes:

determining, by the terminal device, the quantity k of grant-free transmission resources in the first time-domain period according to the following relational expression:

$$k = \text{ceil}(P_1/P_2).$$

Embodiment 6

According to the method described in Embodiment 4, the determining, by the terminal device, the quantity k of grant-free transmission resources in the first time-domain period based on the first time-domain period and the second time-domain period includes:

determining, by the terminal device, the quantity k of grant-free transmission resources in the first time-domain period according to the following relational expression:

$$k = \text{floor}[(P_1-T)/P_2]+1,$$

where

T represents a quantity of time units included in any grant-free transmission resource in the first time-domain period.

Embodiment 7

According to the method described in Embodiment 4, the determining, by the terminal device, the quantity k of grant-free transmission resources in the first time-domain period based on the first time-domain period and the second time-domain period includes:

determining, by the terminal device, the quantity k of grant-free transmission resources in the first time-domain period according to the following relational expression:

$k=\min[\text{ceil}(P_1/P_2),N]$, where

N represents a maximum quantity of times of repeated transmission, the maximum quantity of times of repeated transmission is a maximum quantity of times of sending same uplink data to a network device before feedback information sent by the network device is received, and $N \geq 1$.

Embodiment 8

According to the method described in Embodiment 4, the determining, by the terminal device, the quantity k of grant-free transmission resources in the first time-domain period based on the first time-domain period and the second time-domain period includes:

determining, by the terminal device, the quantity k of grant-free transmission resources in the first time-domain period according to the following relational expression:

$k=\min[\text{floor}[(P_1-T)/P_2]+1,N]$, where

T represents a quantity of time units included in any grant-free transmission resource in the first time-domain period, N represents a maximum quantity of times of repeated transmission, the maximum quantity of times of repeated transmission is a maximum quantity of times of sending same uplink data to a network device before feedback information sent by the network device is received, and $N \geq 1$.

Embodiment 9

According to the method described in any one of Embodiment 1 to Embodiment 8, when the time unit is specifically a mini-slot, the method further includes:

obtaining, by the terminal device, format information of the mini-slot, where the format information of the mini-slot includes at least a quantity of orthogonal frequency division multiplexing OFDM symbols included in each mini-slot and a location of a starting OFDM symbol of each mini-slot in each slot, or includes a location of a starting OFDM symbol and a location of an end OFDM symbol that are of each mini-slot in each slot; and correspondingly, the quantity k of grant-free transmission resources in the first time-domain period is determined based on the first time-domain period, the second time-domain period, and the format information of the mini-slot.

Embodiment 10

A method for determining a time-domain resource used for grant-free transmission is provided, including:

obtaining, by a network device, a quantity k of grant-free transmission resources in a first time-domain period of a grant-free transmission resource; and determining, by the network device based on the first time-domain period, a second time-domain period of a grant-free transmission resource, and the quantity k of grant-free transmission resources in the first time-domain period, an index of a time unit in which a grant-free transmission resource used for receiving grant-free data is located, where a size of the first time-domain period is $P_1$ time units, a size of the second time-domain period is $P_2$ time units, and $P_1$ is greater than or equal to $P_2$.

Embodiment 11

According to the method described in Embodiment 10, the determining, by the network device based on the first time-domain period, a second time-domain period of a grant-free transmission resource, and the quantity k of grant-free transmission resources in the first time-domain period, an index of a time unit in which a grant-free transmission resource used for receiving grant-free data is located includes:

determining, by the network device based on an index of a time unit in which the first grant-free transmission resource is located, the first time-domain period, the second time-domain period, and the quantity k of grant-free transmission resources in the first time-domain period, the index of the time unit in which the grant-free transmission resource used for receiving the grant-free data is located.

Embodiment 12

According to the method described in Embodiment 11, the determining, by the network device based on an index of a time unit in which the first grant-free transmission resource is located, the first time-domain period, the second time-domain period, and the quantity k of grant-free transmission resources in the first time-domain period, the index of the time unit in which the grant-free transmission resource used for receiving the grant-free data is located includes:

determining, by the network device, an index of a time unit in which a grant-free transmission resource Y is located, according to any one of the following relational expressions:

$\text{TU\_index}=\text{Starting\_index}+\text{floor}(Y/k)*P_1+(Y \bmod k)*P_2$;

$\text{TU\_index}=[\text{Starting\_index}+\text{floor}(Y/k)*P_1+(Y \bmod k)*P_2] \bmod X$;

$\text{TU\_index}=\text{Starting\_index}+\text{floor}(Y/k)*P_1+(Y \bmod k)*P_2+F_2$; or $\text{TU\_index}=[\text{Starting\_index}+\text{floor}(Y/k)*P_1+(Y \bmod k)*P_2+F_2] \bmod X$, where $F_2$ represents a correction parameter, and a value of $F_2$ is related to a value of Y;

Y is a nonnegative integer, and is used to indicate a sequence number of a grant-free transmission resource;

X is a preset nonnegative integer;

Starting_index represents the index of the time unit in which the first grant-free transmission resource is located; and TU_index represents an index of a time unit in which any grant-free transmission resource including the first grant-free transmission resource is located.

Embodiment 13

A terminal device is provided, including:

a processing module, configured to obtain a first time-domain period and a second time-domain period of grant-free transmission resources, where a size of the first time-domain period is $P_1$ time units, a size of the second time-domain period is $P_2$ time units, and $P_1$ is greater than or equal to $P_2$, where the processing module is further configured to obtain a quantity k of grant-free transmission resources in the first time-domain period; and the processing module is further configured to determine, based on the first time-domain period, the second time-domain period, and the quantity k of grant-free transmission resources in the first time-domain period, an index of a time unit in which a grant-free transmission resource used for grant-free transmission is located.

Embodiment 14

According to the terminal device described in Embodiment 13, the processing module is further configured to:

determine, based on an index of a time unit in which the first grant-free transmission resource is located, the first time-domain period, the second time-domain period, and the quantity k of grant-free transmission resources in the first time-domain period, the index of the time unit in which the grant-free transmission resource used for grant-free transmission is located.

Embodiment 15

According to the terminal device described in Embodiment 14, the processing module is further configured to:

determine an index of a time unit in which a grant-free transmission resource Y is located, according to any one of the following relational expressions:

$$\text{TU\_index} = \text{Starting\_index} + \text{floor}(Y/k)*P_1 + (Y \bmod k)*P_2;$$

$$\text{TU\_index} = [\text{Starting\_index} + \text{floor}(Y/k)*P_1 + (Y \bmod k)*P_2] \bmod X;$$

$$\text{TU\_index} = \text{Starting\_index} + \text{floor}(Y/k)*P_1 + (Y \bmod k)*P_2 + F_2; \text{ or}$$

$$\text{TU\_index} = [\text{Starting\_index} + \text{floor}(Y/k)*P_1 + (Y \bmod k)*P_2 + F_2] \bmod X,$$

where $F_2$ represents a correction parameter, and a value of $F_2$ is related to a value of Y;

Y is a nonnegative integer, and is used to indicate a sequence number of a grant-free transmission resource;

X is a preset nonnegative integer;

Starting_index represents the index of the time unit in which the first grant-free transmission resource is located; and TU_index represents an index of a time unit in which any grant-free transmission resource including the first grant-free transmission resource is located.

Embodiment 16

According to the terminal device described in any one of Embodiment 13 to Embodiment 15, the quantity k of grant-free transmission resources in the first time-domain period is determined based on the first time-domain period and the second time-domain period.

Embodiment 17

According to the terminal device described in Embodiment 16, the processing module is further configured to:

determine the quantity k of grant-free transmission resources in the first time-domain period according to the following relational expression:

$$k = \text{ceil}(P_1/P_2).$$

Embodiment 18

According to the terminal device described in Embodiment 16, the processing module is further configured to:

determine the quantity k of grant-free transmission resources in the first time-domain period according to the following relational expression:

$$k = \text{floor}[(P_1-T)/P_2] + 1,$$

where

T represents a quantity of time units included in any grant-free transmission resource in the first time-domain period.

Embodiment 19

According to the terminal device described in Embodiment 16, the processing module is further configured to:

determine the quantity k of grant-free transmission resources in the first time-domain period according to the following relational expression:

$$k = \min[\text{ceil}(P_1/P_2), N],$$

where

N represents a maximum quantity of times of repeated transmission, the maximum quantity of times of repeated transmission is a maximum quantity of times of sending same uplink data to a network device before feedback information sent by the network device is received, and $N \geq 1$.

Embodiment 20

According to the terminal device described in Embodiment 16, the processing module is further configured to determine the quantity k of grant-free transmission resources in the first time-domain period according to the following relational expression:

$$k = \min[\text{floor}[(P_1-T)/P_2] + 1, N],$$

where

T represents a quantity of time units included in any grant-free transmission resource in the first time-domain period, N represents a maximum quantity of times of repeated transmission, the maximum quantity of times of repeated transmission is a maximum quantity of times of sending same uplink data to a network device before feedback information sent by the network device is received, and $N \geq 1$.

Embodiment 21

According to the terminal device described in any one of Embodiment 13 to Embodiment 20, when the time unit is specifically a mini-slot, the processing module is further configured to:

obtain format information of the mini-slot, where the format information of the mini-slot includes at least a quantity of orthogonal frequency division multiplexing OFDM symbols included in each mini-slot and a location of a starting OFDM symbol of each mini-slot in each slot, or includes a location of a starting OFDM symbol and a location of an end OFDM symbol that are of each mini-slot in each slot.

Correspondingly, the quantity k of grant-free transmission resources in the first time-domain period is determined based on the first time-domain period, the second time-domain period, and the format information of the mini-slot.

Embodiment 22

A network device is provided, including:
a processing module, configured to obtain a quantity k of grant-free transmission resources in a first time-domain period of a grant-free transmission resource, where
the processing module is further configured to determine, based on the first time-domain period, a second time-domain period of a grant-free transmission resource, and the quantity k of grant-free transmission resources in the first time-domain period, an index of a time unit in which a grant-free transmission resource used for receiving grant-free data is located, where
a size of the first time-domain period is $P_1$ time units, a size of the second time-domain period is $P_2$ time units, and $P_1$ is greater than or equal to $P_2$.

Embodiment 23

According to the network device described in Embodiment 22, the processing module is further configured to:
determine, based on an index of a time unit in which the first grant-free transmission resource is located, the first time-domain period, the second time-domain period, and the quantity k of grant-free transmission resources in the first time-domain period, the index of the time unit in which the grant-free transmission resource used for receiving the grant-free data is located.

Embodiment 24

According to the network device described in Embodiment 23, the processing module is further configured to:
determine an index of a time unit in which a grant-free transmission resource Y is located, according to any one of the following relational expressions:

$$TU\_index = Starting\_index + floor(Y/k)*P_1 + (Y \bmod k)*P_2;$$

$$TU\_index = [Starting\_index + floor(Y/k)*P_1 + (Y \bmod k)*P_2] \bmod X;$$

$$TU\_index = Starting\_index + floor(Y/k)*P_1 + (Y \bmod k)*P_2 + F_2; \text{ or}$$

$$TU\_index = [Starting\_index + floor(Y/k)*P_1 + (Y \bmod k)*P_2 + F_2] \bmod X,$$

where
$F_2$ represents a correction parameter, and a value of $F_2$ is related to a value of Y;
Y is a nonnegative integer, and is used to indicate a sequence number of a grant-free transmission resource;
X is a preset nonnegative integer;
Starting_index represents the index of the time unit in which the first grant-free transmission resource is located; and
TU_index represents an index of a time unit in which any grant-free transmission resource including the first grant-free transmission resource is located.

A person of ordinary skill in the art may be aware that, units and algorithm steps in the examples described with reference to the embodiments disclosed in this specification can be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for ease and brevity of description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be indirect couplings or communication connections through some interfaces, apparatuses, or units, and may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements, to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a time-domain resource used for grant-free transmission, comprising:

obtaining, by a terminal device, grant-free transmission resource configuration information, wherein the configuration information comprises: a time-domain resource allocation parameter, a time-domain resource offset parameter, and a grant-free transmission resource time-domain period, the time-domain resource allocation parameter is used to indicate an index, in a slot, of an OFDM symbol in which the first grant-free transmission resource is located, and the time-domain resource offset parameter is used to indicate an index of the slot in which the first grant-free transmission resource is located; and determining a time-domain location of a grant-free transmission resource based on the index, in the slot, of the OFDM symbol in which the first grant-free transmission resource is located, the index of the slot in which the first grant-free transmission resource is located, and the grant-free transmission resource time-domain period, wherein the determining a time-domain location of a grant-free transmission resource based on the index, in the slot, of the OFDM symbol in which the first grant-free transmission resource is located, the index of the slot in which the first grant-free transmission resource is located, and the grant-free transmission resource time-domain period comprises:

determining a starting OFDM symbol of a grant-free transmission resource Y according to the following formula:

$$SFN*M\_slot*M\_symbol+slot\_index*M\_symbol+symbol\_index=[offset*M\_symbol+symbol\_index\_Starting+Y*P] \bmod X,$$

where:

SFN represents a system frame number of a radio frame in which the starting OFDM symbol is located, M_slot represents a quantity of slots comprised in one radio frame, M_symbol represents a quantity of OFDM symbols comprised in one slot, slot_index represents an index of a slot in which the starting OFDM symbol is located, symbol_index represents an index of the starting OFDM symbol in the slot, offset represents the index of a slot in which the first grant-free transmission resource is located, symbol_index_Starting represents the index, in a slot, of the OFDM symbol in which the first grant-free transmission resource is located, P represents the grant-free transmission resource time-domain period, and X is a preset nonnegative integer.

2. The method according to claim 1, wherein offset=SFN_starting*M_slot+slot_index_Starting, wherein SFN_starting represents a system frame number of a radio frame in which the OFDM symbol with the index symbol_inde_Starting is located, slot_index_Starting represents an index, in the radio frame, of the slot in which the OFDM symbol with the index symbol_index_Starting is located, and slot_index_Starting and SFN_Starting are determined based on the time-domain resource offset parameter.

3. The method according to claim 1, wherein the method further comprises:

discarding or ignoring the grant-free transmission resource Y when the slot in which the determined grant-free transmission resource Y is located is unavailable.

4. A method for determining a time-domain resource used for grant-free transmission, comprising:

sending, by a network device, grant-free transmission resource configuration information to a terminal device, wherein the configuration information comprises: a time-domain resource allocation parameter, a time-domain resource offset parameter, and a grant-free transmission resource time-domain period, the time-domain resource allocation parameter is used to indicate an index, in a slot, of an OFDM symbol in which the first grant-free transmission resource is located, and the time-domain resource offset parameter is used to indicate an index of the slot in which the first grant-free transmission resource is located; and determining, by the network device based on the index, in the slot, of the OFDM symbol in which the first grant-free transmission resource is located, the index of the slot in which the first grant-free transmission resource is located, and the grant-free transmission resource time-domain period, an index of a slot in which a grant-free transmission resource used for receiving grant-free data of the terminal device is located, wherein the determining, by the network device based on the index, in the slot, of the OFDM symbol in which the first grant-free transmission resource is located, the index of the slot in which the first grant-free transmission resource is located, and the grant-free transmission resource time-domain period, an index of a slot in which a grant-free transmission resource used for receiving grant-free data of the terminal device is located comprises:

determining a starting OFDM symbol of a grant-free transmission resource Y according to the following formula:

$$SFN*M\_slot*M\_symbol+slot\_index*M\_symbol+symbol\_index=[offset*M\_symbol+symbol\_index\_Starting+Y*P] \bmod X,$$

where:

SFN represents a system frame number of a radio frame in which the starting OFDM symbol is located, M_slot represents a quantity of slots comprised in one radio frame, M_symbol represents a quantity of OFDM symbols comprised in one slot, slot_index represents an index of a slot in which the starting OFDM symbol is located, symbol_index represents an index of the starting OFDM symbol in the slot, offset represents the index of a slot in which the first grant-free transmission resource is located, symbol_index_Starting represents the index, in a slot, of the OFDM symbol in which the first grant-free transmission resource is located, P represents the grant-free transmission resource time-domain period, and X is a preset nonnegative integer.

5. The method according to claim 4, wherein offset=SFN_starting*M_slot+slot_index_Starting, wherein SFN_starting represents a system frame number of a radio frame in which the OFDM symbol with the index symbol_index_Starting is located, slot_index_Starting represents an index, in the radio frame, of the slot in which the OFDM symbol with the index symbol_index_Starting is located, and slot_index_Starting and SFN_Starting are determined based on the time-domain resource offset parameter.

6. The method according to claim 4, wherein the method further comprises:
discarding or ignoring the grant-free transmission resource Y when the slot in which the determined grant-free transmission resource Y is located is unavailable.

7. A communications apparatus, wherein the communications apparatus comprises:
a receiving module, configured to receive grant-free transmission resource configuration information sent by a network device, wherein the configuration information comprises: a time-domain resource allocation parameter, a time-domain resource offset parameter, and a grant-free transmission resource time-domain period, the time-domain resource allocation parameter is used to indicate an index, in a slot, of an OFDM symbol in which the first grant-free transmission resource is located, and the time-domain resource offset parameter is used to indicate an index of the slot in which the first grant-free transmission resource is located; and
a processing module, configured to determine a time-domain location of a grant-free transmission resource based on the index, in the slot, of the OFDM symbol in which the first grant-free transmission resource is located, the index of the slot in which the first grant-free transmission resource is located, and the grant-free transmission resource time-domain period,
wherein the processing module is configured to determine a starting OFDM symbol of a grant-free transmission resource Y according to the following formula:

$$SFN*M\_slot*M\_symbol+slot\_index*M\_symbol+symbol\_index=[offset*M\_symbol+symbol\_index\_Starting+Y*P] \bmod X,$$

where:
SFN represents a system frame number of a radio frame in which the starting OFDM symbol is located, M_slot represents a quantity of slots comprised in one radio frame, M_symbol represents a quantity of OFDM symbols comprised in one slot, slot_index represents an index of a slot in which the starting OFDM symbol is located, symbol_index represents an index of the starting OFDM symbol in the slot, offset represents the index of a slot in which the first grant-free transmission resource is located, symbol_index_Starting represents the index, in a slot, of the OFDM symbol in which the first grant-free transmission resource is located, P represents the grant-free transmission resource time-domain period, and X is a preset nonnegative integer.

8. The communications apparatus according to claim 7, wherein offset=SFN_starting*M_slot+slot_index_Starting, wherein SFN_starting represents a system frame number of a radio frame in which the OFDM symbol with the index symbol_index_Starting is located, slot_index_Starting represents an index, in the radio frame, of the slot in which the OFDM symbol with the index symbol_index_Starting is located, and slot_index_Starting and SFN_Starting are determined based on the time-domain resource offset parameter.

9. The communications apparatus according to claim 7, wherein the processing module is further configured to discard or ignore the grant-free transmission resource Y when the slot in which the determined grant-free transmission resource Y is located is unavailable.

10. A communications apparatus, wherein the communications apparatus comprises:
a sending module, configured to send grant-free transmission resource configuration information to a terminal device, wherein the configuration information comprises: a time-domain resource allocation parameter, a time-domain resource offset parameter, and a grant-free transmission resource time-domain period, the time-domain resource allocation parameter is used to indicate an index, in a slot, of an OFDM symbol in which the first grant-free transmission resource is located, and the time-domain resource offset parameter is used to indicate an index of the slot in which the first grant-free transmission resource is located; and
a processing module, configured to determine, based on the index, in the slot, of the OFDM symbol in which the first grant-free transmission resource is located, the index of the slot in which the first grant-free transmission resource is located, and the grant-free transmission resource time-domain period, an index of a slot in which a grant-free transmission resource used for receiving grant-free data of the terminal device is located,
wherein the processing module is configured to determine a starting OFDM symbol of a grant-free transmission resource Y according to the following formula:

$$SFN*M\_slot*M\_symbol+slot\_index*M\_symbol+symbol\_index=[offset*M\_symbol+symbol\_index\_Starting+Y*P] \bmod X,$$

where:
SFN represents a system frame number of a radio frame in which the starting OFDM symbol is located, M_slot represents a quantity of slots comprised in one radio frame, M_symbol represents a quantity of OFDM symbols comprised in one slot, slot_index represents an index of a slot in which the starting OFDM symbol is located, symbol_index represents an index of the starting OFDM symbol in the slot, offset represents the index of a slot in which the first grant-free transmission resource is located, symbol_index_Starting represents the index, in a slot, of the OFDM symbol in which the first grant-free transmission resource is located, P represents the grant-free transmission resource time-domain period, and X is a preset nonnegative integer.

11. The communications apparatus according to claim 10, wherein offset=SFN_starting*M_slot+slot_index_Starting, wherein SFN_starting represents a system frame number of a radio frame in which the OFDM symbol with the index symbol_index_Starting is located, slot_index_Starting represents an index, in the radio frame, of the slot in which the OFDM symbol with the index symbol_index_Starting is located, and slot_index_Starting and SFN_Starting are determined based on the time-domain resource offset parameter.

12. The communications apparatus according to claim 10, wherein the processing module is further configured to discard or ignore the grant-free transmission resource Y when the slot in which the determined grant-free transmission resource Y is located is unavailable.

13. A computer readable storage medium, wherein a computer program is stored in the computer readable storage medium, and when the program is executed by a processor, the processor is caused to perform a method comprising:

obtaining grant-free transmission resource configuration information, wherein the configuration information comprises: a time-domain resource allocation parameter, a time-domain resource offset parameter, and a grant-free transmission resource time-domain period, the time-domain resource allocation parameter is used to indicate an index, in a slot, of an OFDM symbol in which the first grant-free transmission resource is located, and the time-domain resource offset parameter is used to indicate an index of the slot in which the first grant-free transmission resource is located; and determining a time-domain location of a grant-free transmission resource based on the index, in the slot, of the OFDM symbol in which the first grant-free transmission resource is located, the index of the slot in which the first grant-free transmission resource is located, and the grant-free transmission resource time-domain period, wherein the determining a time-domain location of a grant-free transmission resource based on the index, in the slot, of the OFDM symbol in which the first grant-free transmission resource is located, the index of the slot in which the first grant-free transmission resource is located, and the grant-free transmission resource time-domain period comprises:

determining a starting OFDM symbol of a grant-free transmission resource Y according to the following formula:

$SFN*M\_slot*M\_symbol+slot\_index*M\_symbol+symbol\_index=[offset*M\_symbol+symbol\_index\_Starting+Y*P] \bmod X,$ where:

SFN represents a system frame number of a radio frame in which the starting OFDM symbol is located, M_slot represents a quantity of slots comprised in one radio frame, M_symbol represents a quantity of OFDM symbols comprised in one slot, slot_index represents an index of a slot in which the starting OFDM symbol is located, symbol_index represents an index of the starting OFDM symbol in the slot, offset represents the index of a slot in which the first grant-free transmission resource is located, symbol_index_Starting represents the index, in a slot, of the OFDM symbol in which the first grant-free transmission resource is located, P represents the grant-free transmission resource time-domain period, and X is a preset nonnegative integer.

14. A computer readable storage medium, wherein a computer program is stored in the computer readable storage medium, and when the program is executed by a processor, the processor is caused to perform a method comprising:

sending grant-free transmission resource configuration information to a terminal device, wherein the configuration information comprises: a time-domain resource allocation parameter, a time-domain resource offset parameter, and a grant-free transmission resource time-domain period, the time-domain resource allocation parameter is used to indicate an index, in a slot, of an OFDM symbol in which the first grant-free transmission resource is located, and the time-domain resource offset parameter is used to indicate an index of the slot in which the first grant-free transmission resource is located; and determining, based on the index, in the slot, of the OFDM symbol in which the first grant-free transmission resource is located, the index of the slot in which the first grant-free transmission resource is located, and the grant-free transmission resource time-domain period, an index of a slot in which a grant-free transmission resource used for receiving grant-free data of the terminal device is located, wherein the determining, by the network device based on the index, in the slot, of the OFDM symbol in which the first grant-free transmission resource is located, the index of the slot in which the first grant-free transmission resource is located, and the grant-free transmission resource time-domain period, an index of a slot in which a grant-free transmission resource used for receiving grant-free data of the terminal device is located comprises:

determining a starting OFDM symbol of a grant-free transmission resource Y according to the following formula:

$SFN*M\_slot*M\_symbol+slot\_index*M\_symbol+symbol\_index=[offset*M\_symbol+symbol\_index\_Starting+Y*P] \bmod X,$ where:

SFN represents a system frame number of a radio frame in which the starting OFDM symbol is located, M_slot represents a quantity of slots comprised in one radio frame, M_symbol represents a quantity of OFDM symbols comprised in one slot, slot_index represents an index of a slot in which the starting OFDM symbol is located, symbol_index represents an index of the starting OFDM symbol in the slot, offset represents the index of a slot in which the first grant-free transmission resource is located, symbol_index_Starting represents the index, in a slot, of the OFDM symbol in which the first grant-free transmission resource is located, P represents the grant-free transmission resource time-domain period, and X is a preset nonnegative integer.

* * * * *

UNITED STATES PATENT AND TRADEMARK OFFICE
CERTIFICATE OF CORRECTION

| | |
|---|---|
| PATENT NO. | : 11,515,972 B2 |
| APPLICATION NO. | : 16/875824 |
| DATED | : November 29, 2022 |
| INVENTOR(S) | : Xu et al. |

It is certified that error appears in the above-identified patent and that said Letters Patent is hereby corrected as shown below:

In the Claims

Claim 2: Column 47, Line 63: "inde_Starting is located, slot_index_Starting represents an" should read -- index_Starting is located, slot_index_Starting represents an --.

Signed and Sealed this
Eleventh Day of April, 2023

Katherine Kelly Vidal
*Director of the United States Patent and Trademark Office*